(12) United States Patent
Dasylva et al.

(10) Patent No.: US 7,010,225 B1
(45) Date of Patent: Mar. 7, 2006

(54) TECHNIQUE FOR INTERCHANGING WAVELENGTHS IN A MULTI-WAVELENGTH SYSTEM

(75) Inventors: Abel C. Dasylva, Ottawa (CA); Delfin Y. Montuno, Kanata (CA); Guo-Qiang Wang, Nepean (CA)

(73) Assignee: Nortel Networks Limited, Quebec (CA)

( * ) Notice: Subject to any disclaimer, the term of this patent is extended or adjusted under 35 U.S.C. 154(b) by 707 days.

(21) Appl. No.: 09/749,946

(22) Filed: Dec. 29, 2000

(51) Int. Cl.
    *H04B 10/00* (2006.01)
(52) U.S. Cl. .......................................... 398/45; 398/48
(58) Field of Classification Search ................. 398/50, 398/79, 43–57; 370/351, 480, 481
    See application file for complete search history.

(56) References Cited

U.S. PATENT DOCUMENTS

| | | | |
|---|---|---|---|
| 5,148,428 A * | 9/1992 | Lee | 370/411 |
| 6,175,432 B1 * | 1/2001 | Wu et al. | 398/65 |
| 6,487,332 B1 * | 11/2002 | Rasala et al. | 385/17 |
| 6,532,090 B1 * | 3/2003 | Doerr et al. | 398/82 |
| 2003/0091271 A1 * | 5/2003 | Dragone | 385/20 |

OTHER PUBLICATIONS

Gu, Q.P. "Efficient Protocols for Permutation Routing on All-Optical Multistage Interconnection Networks" Aug. 21-24, 2000, IEEE Parallel Processing, 2000. Proceedings. 2000 International Conference on.*

B. Ramamurthy, and B Mukherjee, "Wavelength-conversion in WDM networking", IEEE Journal on Selected Areas on Communications, vol. 16, pp. 1061-1073, Sep. 1998.

S. Yoo, "Wavelength-conversion technologies for WDM network applications", IEEE Journal of Lightwave Technology, vol. 14, pp. 955-966, Jun. 1996.

K. Lee, and V. Li, "A frequency-convertible optical network", IEEE Journal of Lightwave Technology, vol. 11, pp. 962-970, May-Jun. 1993.

N. Antoniades, S. Yoo, K. Bala, G. Ellinas, and T. Stern, "An architecture for a wavelength-interchanging cross-connect utilizing parametric frequency-converters", IEEE Journal of Lightwave Technology, vol. 17, pp. 113-1125, Jul. 1999.

R. Thompson, and D. Hunter, "Elementary photonic switching modules in three divisions", IEEE Journal on Selected Areas in Communications, vol. 14, pp. 362-373, Feb. 1996.

* cited by examiner

*Primary Examiner*—Agustin Bello
(74) *Attorney, Agent, or Firm*—Hunton & Williams LLP

(57) ABSTRACT

A technique for interchanging wavelengths in a multi-wavelength system having W wavelength channels is disclosed. In one embodiment, the technique is realized by selectively directing a pair of adjacent frequency channels corresponding to a respective pair of adjacent wavelength channels based upon a routing algorithm. The frequencies of the selectively directed pair of adjacent frequency channels are then interchanged. The interchanged frequencies of the selectively directed pair of adjacent frequency channels are then selectively shifted based upon a binary representation of each interchanged frequency.

20 Claims, 25 Drawing Sheets

DIFFERENCE-FREQUENCY GENERATION

LOG$_2$(8,1,1)NETWORK

ORIGINAL SELF-ROUTING NETWORK | ONE HORIZONTAL EXTENSION

LOG$_2$(8,2,1)NETWORK

ORIGINAL SELF-ROUTING NETWORK | TWO HORIZONTAL EXTENSIONS

BAR STATE

CROSS STATE

|  | P(0) | P(h) $0<h<n$ | P(n) |
|---|---|---|---|
| OMEGA | $\sigma_{n-1}$ | $\sigma_{n-1}$ | J |
| OMEGA$^{-1}$ | J | $\sigma_{n-1}^{-1}$ | $\sigma_{n-1}^{-1}$ |
| SW-BANYAN | J | $\beta_h$ | J |
| SW-BANYAN$^{-1}$ | J | $\beta_{n-h}$ | J |
| N-CUBE | $\sigma_{n-1}$ | $\beta_{n-h}$ | J |
| N-CUBE$^{-1}$ | J | $\beta_h$ | $\sigma_{n-1}^{-1}$ |
| BASELINE | J | $\sigma_{n-h}^{-1}$ | J |
| BASELINE$^{-1}$ | J | $\sigma_h$ | J |

FIG. 25

| COMPONENT | NUMBER | FREQUENCY-SHIFTERS |
|---|---|---|
| STATE CHANGER | $\log_2(W)$ | 2 |
| BUTTERFLY ISCM | $\log_2(W)-1$ | 2 |

FIG. 26

| SELF-ROUTING NETWORK | NUMBER OF FREQUENCY-SHIFTERS |
|---|---|
| SW-BANYAN | $O(\log_2 W)$ |
| BASELINE | $O((\log_2 W)^2)$ |
| N-CUBE | $O(\log_2 W)$ |
| OMEGA | $O((\log_2 W)^2)$ |

FIG. 27

| NETWORKS | NEAR-OPTIMAL PARAMETER CHOICE | WAVELENGTH-INTERCHANGER FREQUENCY-SHIFTER COMPLEXITY | OVERALL SEPARABLE CROSS-CONNECT FREQUENCY-SHIFTER COMPLEXITY |
|---|---|---|---|
| NEAR-OPTIMAL REARRANGEABLY NONBLOCKING | $m = w-1$<br>$p = 1$ | $4w-4$ | $4.F.(w-1)$ |
| NEAR-OPTIMAL STRICTLY-NONBLOCKING | $m = w-1$<br>$p = w$ | $4.w^2-4.w$ | $4.F.w.(w-1)$ |

FIG. 28

TECHNIQUE FOR INTERCHANGING WAVELENGTHS IN A MULTI-WAVELENGTH SYSTEM

CROSS-REFERENCE TO RELATED APPLICATIONS

This patent application is related to U.S. patent application Ser. No. 09/750,304, filed concurrently with this patent application, and which is hereby incorporated by reference herein in its entirety.

This patent application is also related to U.S. patent application Ser. No. 09/750,316, filed concurrently with this patent application, and which is hereby incorporated by reference herein in its entirety.

FIELD OF THE INVENTION

The present invention relates generally to wavelength interchangers and, more particularly, to a technique for interchanging wavelengths in a multi-wavelength system.

BACKGROUND OF THE INVENTION

To fully exploit the bandwidth promised by fiber-optic transmissions, it is necessary to build all-optical networks where optical signals are not converted into an electrical form, except at ingress or egress nodes. In circuit-switched wavelength division multiplexing networks, all-optical routing is provided by all-optical cross-connects capable of switching individual wavelength channels. Circuit-switched wavelength division multiplexed networks share some of the characteristics of traditional circuit-switched networks. However, major differences appear when some cross-connects are not capable of converting frequencies. When this situation occurs, traditional routing algorithms must be modified, and wavelength-continuity constraints must be considered (see B. Ramamurthy and B. Mukherjee, "Wavelength-conversion in WDM networking", IEEE Journal on Selected Areas on Communications, vol. 16, pages 1061–1073, September 1998). These constraints impose that on nodes without wavelength conversion capability, incoming wavelength channels must be switched to outgoing channels on the same frequency. Wavelength continuity constraints lead to degradations of network blocking performance, and they increase the complexity of bandwidth allocation protocols. These constraints can be removed by using fully-convertible nodes. In transparent all-optical networks, all-optical wavelength converters must be used. However, high costs of all-optical converters often limit the utilization of fully wavelength-convertible nodes, as the number of wavelengths and the size of the network grow. For this reason, much effort has been devoted to routing strategies that optimally use limited wavelength conversion resources (see B. Ramamurthy et al. referenced above).

To address the same problem, another approach is to try and design fully-convertible cross-connects using a minimum number of all-optical converters (see N. Antoniades, S. Yoo, K. Bala, G. Ellinas, and T. Stern, "An architecture for a wavelength-interchanging cross-connect utilizing parametric wavelength-converters", IEEE Journal of Lightwave Technology, vol. 17, pages 1113–1125, July 1999). Before the development of wave-mixing wavelength converters, this approach has inevitably lead to solutions that assigned a dedicated full-range wavelength converter to each wavelength channel on each fiber link.

With these previous approaches, strictly non-blocking fully-convertible nodes require a number of converters equal to the total number of wavelength channels (in all the fibers). A common characteristic of these first designs is to convert channels through a single wavelength conversion operation, usually carried out at the inputs or at the outputs of a space switch. For this class of solutions, the problem lies in high converter costs. Indeed, for a cross-connect with F fibers and W frequencies per fiber, these solutions require as many as F.W dedicated all-optical converters.

Wave-mixing converters and their bulk wavelength conversion abilities offer new options for designing wavelength-interchanging cross-connects. One particular technique to achieve this goal has been proposed, wherein a wavelength-to-space transformation is exploited (see N. Antoniades et al. referenced above; also see R. Thompson and D. Hunter, "Elementary photonic switching modules in three divisions", IEEE Journal on Selected Areas in Communications, vol. 14, pp. 362–373, February 1996). In the transformation, channels are simultaneously switched in the space and in the wavelength-domains at each stage. Unlike previous techniques based on single-stage wavelength conversion, this approach converts individual wavelength channels by decomposing these conversions into several elementary wavelength conversions operations (see N. Antoniades et al. referenced above). Also, in this design, the resulting cross-connect architecture is rearrangeably non-blocking and only uses a number of wave-mixing converters equal to half the total number of wavelength channels (see N. Antoniades et al. referenced above). In other words, for a cross-connect with F fibers and W frequencies per fiber, this solution only requires a total of F.W/2 wave-mixing converters (see N. Antoniades et al. referenced above), instead of F.W converters, as would be obtained with other approaches (see B. Ramamurthy et al. referenced above).

In spite of its merits, this design is only rearrangeably non-blocking. Therefore, when it is used, ongoing connections may have to be rearranged to switch new requests. However, high traffic volumes make it difficult to reroute existing lightpaths, without incurring severe QoS degradation. It is possible to build strictly non-blocking cross-connects by combining this solution with the technique of vertical replication (see A. Pattavina, Switching Theory, Wiley, 1998). Yet, when doing so, more converters are required than by other designs based on dedicated wavelength converters.

Another problem of this transformation solution is that it is not adapted to provide a gradual deployment of wavelength conversion (see N. Antoniades et al. and R. Thompson et al. referenced above). Indeed, current semiconductor technology makes it possible to build large wavelength-selective cross-connects at low costs. However, all-optical wavelength converters are in their early development stages, and are still produced at high costs. In a metropolitan network environment, service providers would prefer to start with a simple wavelength-selective cross-connect to minimize initial costs. They would then have the flexibility to upgrade the all-optical wavelength conversion capabilities when special needs appear.

In view of the foregoing, it would be desirable to provide a technique for interchanging wavelengths in a multi-wavelength system in an efficient and cost effective manner which overcomes the above-described inadequacies and shortcomings.

SUMMARY OF THE INVENTION

According to the present invention, a technique for interchanging wavelengths in a multi-wavelength system having W wavelength channels is provided. In one embodiment, the technique is realized by selectively directing a pair of adjacent frequency channels corresponding to a respective pair of adjacent wavelength channels based upon a routing algorithm. The frequencies of the selectively directed pair of adjacent frequency channels are then interchanged. The interchanged frequencies of the selectively directed pair of adjacent frequency channels are then selectively shifted based upon a binary representation of each interchanged frequency.

In accordance with other aspects of the present invention, the pair of adjacent frequency channels are beneficially selectively directed by selectively switching the pair of adjacent frequency channels to one of two output pairs. In accordance with further aspects of the present invention, the frequencies of the selectively directed pair of adjacent frequency channels are beneficially interchanged by routing the selectively directed pair of adjacent frequency channels based upon a binary representation of the frequency of each of the selectively directed pair of adjacent frequency channels. The frequencies of the selectively directed pair of adjacent frequency channels are then further beneficially interchanged by shifting the frequency of a first of the selectively directed pair of adjacent frequency channels by an amount defined by $+\Delta f$ and shifting the frequency of a second of the selectively directed pair of adjacent frequency channels by an amount defined by $-\Delta f$, wherein $\Delta f$ is the frequency spacing between the pair of adjacent frequency channels.

In accordance with still further aspects of the present invention, the interchanged frequencies of the selectively directed pair of adjacent frequency channels are beneficially selectively shifted by routing the selectively directed pair of adjacent frequency channels based upon the binary representation of each interchanged frequency. The interchanged frequencies of the selectively directed pair of adjacent frequency channels are then further beneficially selectively shifted by shifting the frequency of at least one of the selectively directed pair of adjacent frequency channels by an amount defined by $\pm(2^h-1)\Delta f$, wherein $h=0, \ldots, w-1$, $w=\log_2 W$, and $\Delta f$ is the frequency spacing between the pair of adjacent frequency channels. Alternatively, the interchanged frequencies of the selectively directed pair of adjacent frequency channels are then further beneficially selectively shifted by shifting the frequency of at least one of the selectively directed pair of adjacent frequency channels by an amount defined by $-2^h\Delta f$, increasing the shifted frequency of the at least one of the selectively directed pair of adjacent frequency channels, and then shifting the increased shifted frequency of the at least one of the selectively directed pair of adjacent frequency channels by an amount defined by $+\Delta f$, wherein $h=0, \ldots, w-1$, $w=\log_2 W$, and $\Delta f$ is the frequency spacing between the pair of adjacent frequency channels. Alternatively still, the interchanged frequencies of the selectively directed pair of adjacent frequency channels are then further beneficially selectively shifted by shifting the frequency of at least one of the selectively directed pair of adjacent frequency channels by an amount defined by $-\Delta f$, decreasing the shifted frequency of the at least one of the selectively directed pair of adjacent frequency channels, and then shifting the decreased shifted frequency of the at least one of the selectively directed pair of adjacent frequency channels by an amount defined by $+2^h\Delta f$, wherein $h=0, \ldots, w-1$, $w=\log_2 W$ and $\Delta f$ is the frequency spacing between the pair of adjacent frequency channels.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 25 is a table containing the type of permutation used at each stage of several self-routing networks.

FIG. 26 is a table containing the converter costs of a SW-Banyan wavelength interchanger in accordance with the present invention.

FIG. 27 is a table containing the converter complexity of different self-routing wavelength interchangers in accordance with the present invention.

FIG. 28 is a table containing the frequency shifter complexity of near-optimal $\log_2(W,m,p)$ wavelength interchangers and associated separable wavelength-interchanging cross-connects in accordance with the present invention.

DETAILED DESCRIPTION OF EXEMPLARY EMBODIMENT(S)

Figure 1:
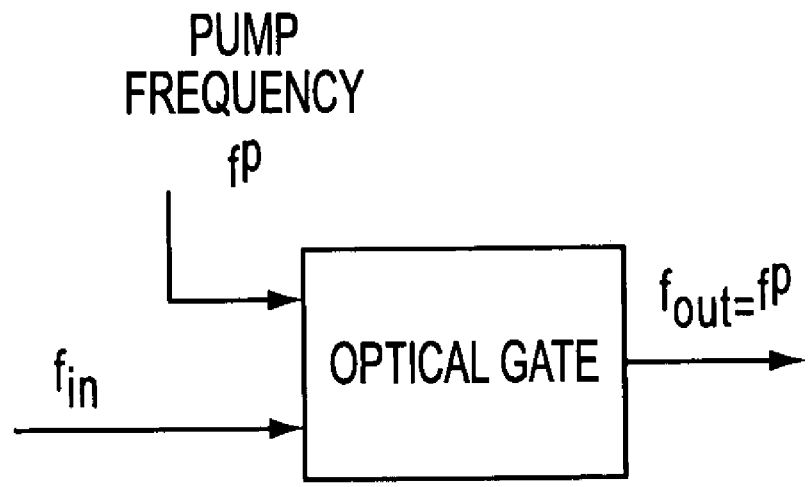
FIG. 1 shows an exemplary prior art optical-gating wavelength converter.

The present invention provides new architectures for wavelength-interchanging cross-connects based on wave-mixing converters. In these new architectures, the different switching domains are separated. The resulting cross-connect architecture comprises a central wavelength-selective cross-connect, and peripheral wavelength interchangers located at the inputs or outputs of the wavelength-selective cross-connect. The function of the wavelength-selective cross-connect is to switch channels spatially, while that of the wavelength interchangers is only to provide permutations of the wavelength channels incoming (or outgoing) on given fibers.

The present invention is focused on the internal design of wavelength interchangers. That is, the present invention focuses on a wavelength interchanger architecture that shares some of the important characteristics of the multi-stage conversion design described in previous work. The common features are the use of bulk wavelength conversions in wave-mixing converters, and multi-stage wavelength conversions of individual wavelength channels. But the present invention also has multiple fundamentally new aspects. First, a new and more intuitive wavelength-to-space transformation is used. The principle of this transformation is to select some regular interconnection network and to assign the frequency $f_{i \bmod W}$ to some inlet or outlet i in each switching stage. When starting from an interconnection network built out of 2×2 elements, the transformation yields a logical network where each switching element has two different frequencies assigned to its two inlets or outlets. Also, in this logical representation, an outlet of some stage may connect to some inlet of the next stage, while the inlets and outlets are assigned different frequencies. Therefore, the new transformation leads to solutions where wavelength converters are needed to change the states of switching elements, and to provide inter-stage connection patterns.

At first glance, this new transformation appears to be less elegant and more costly (in terms of converter requirements) than previous transformations. However, this new transformation has the advantage of decoupling the design of switching elements from that of interstage connection patterns. In addition to this advantage, this new transformation may also produce cost-effective wavelength interchangers (i.e., wavelength interchangers with a significantly lower converter complexity than previous designs). To meet this goal, a new physical implementation of the switching elements is provided, which allows the state of any switching elements to be changed at minimum converter costs. The key to this economical realization is to observe that each switching element processes adjacent frequencies (modulo w). Assume that available frequencies are of the form $f_i = f_0 + i \cdot \Delta f$, where $i=0,\ldots,W-1$, and that each 2×2 switching element processes some frequencies $f_{2i}$ and $f_{2i+1}$, where $i=0,\ldots,W/2-1$. Some element may be changed from the bar to the cross-state by up-shifting $f_{2i}$ by $+\Delta f$, and by down-shifting $f_{2i+1}$ by $-\Delta f$. Then, for each stage, if a single pair of frequency shifting devices are used that are based on wave-mixing, and shifts in an amount of $+\Delta f$ are provided to even frequencies, while shifts in an amount of $-\Delta f$ are provided to odd frequencies, the state of any 2×2 switching element in the stage can be changed.

In accordance with the present invention, a device containing frequency shifters and wavelength routers to selectively provide the frequency shifts to the different channels is called a state changer. Therefore, one state changer is needed for each switching stage, and the converter complexity of such a device is constant, and independent of W. Common interconnection networks have a number of stages of the order of the logarithm of their size. As a result, in the present invention architectures, the expected converter costs for all the required state changers is $O(\log_2 W)$. The present invention technique also requires wavelength conversions to be provided for inter-stage connection patterns. Usual connection patterns, such as shuffles or butterfly permutations, have interesting arithmetic properties that are exploited in accordance with the present invention to reduce converter costs. For example, in the case of a butterfly permutation, a sequence of w bits such as $b_{w-1} \ldots b_{h+1} b_h b_{h-1} \ldots b_0$ is mapped to $b_{w-1} \ldots b_{h+1} b_0 b_{h-1} \ldots b_h$, where h is an integer specific to the butterfly permutation. In other words, for a given h, the butterfly permutation simply swaps the bit in position 0 and the bit in position h. In the wavelength domain, the butterfly permutation maps some frequency $f_i = f_0 + i \cdot \Delta f$, such that $b_{w-1} \ldots b_{h+1} b_h b_{h-1} \ldots b_0$ is the binary representation of i, to the frequency $f_j = f_0 + j \cdot \Delta f$, such that $b_{w-1} \ldots b_{h+1} b_0 b_{h-1} \ldots b_h$ is the binary representation of j. The butterfly permutation can be implemented with few converters by exploiting the following key observations on the permutation:

1.) Frequencies $f_i$ such that the binary representation of i is either of the form $b_{w-1} \ldots b_{h+1} 0 b_{h-1} \ldots b_1 0$ or $b_{w-1} \ldots b_{h+1} 1 b_{h-1} \ldots b_1 1$ are left unchanged;

2.) Frequencies $f_i$ such that the binary representation of i is of the form $b_{w-1} \ldots b_{h+1} 1 b_{h-1} \ldots b_1 0$ are translated by $-(2^h - 1)\Delta f$; and 3.) Frequencies $f_i$ such that the binary representation of i is of the form $b_{w-1} \ldots b_{h+1} 0 b_{h-1} \ldots b_1 1$ are translated by $+(2^h - 1)\Delta f$.

Therefore, between any two switching stages, butterfly frequency permutations can be implemented with a pair of frequency shifting devices providing frequency shifts in the amount of $-(2^h - 1)\Delta f$ or $+(2^h - 1)\Delta f$. As before, some butterfly inter-stage connections may be provided with a constant number of all-optical converters, independent of the number W of frequencies. Other important permutations such as shuffles and inverse shuffles are described next. For a given $0 \leq h \leq w-1$, the shuffle $\sigma_h$ does a right-to-left circular permutation of the last h+1 bits of any sequence of binary digits. In other words, $\sigma_h$ maps any sequence $b_{w-1}b_{w-2} \ldots b_0$ to $b_{w-1} \ldots b_{h+1}b_{h-1} \ldots b_0b_h$. For the same h, an inverse shuffle permutation is simply the inverse permutation of the shuffle $\sigma_h$. Therefore, the corresponding inverse shuffle permutation is denoted by $\sigma_h^{-1}$. The permutation $\sigma_h^{-1}$ maps some binary sequence $b_{w-1}b_{w-2} \ldots b_0$ to $b_{w-1}b_0b_h \ldots b_1$ For a given $0 \leq h \leq N-1$, both types of permutations may be conveniently described with constrained increasing frequency mappings (see related U.S. patent application Ser. No. 09/750,304 referenced above). In a system with $W=2^w$ frequencies of the form $f_i=f_0+i.\Delta f$, specific sets of frequencies are considered and denoted by $\Phi^h$ where $0 \leq h \leq w-1$. For a given value of h, the set $\Phi^h$ contains all the frequencies such that the h-th least significant digit of the binary representation of their index is null. In other words, a frequency $f_i$ belongs to $\Phi^h$ if the binary representation of i is $b_{w-1} \ldots b_0$, where $b_h=0$. Then the mapping $\Gamma_h$ is introduced such that some input frequency $$f_i = f_0 + \Delta f \cdot \left( \sum_{l=0}^{w-1} 2^l \cdot b_l \right)$$

in $\Phi^h$ is mapped to $$\Gamma_h(f_i) = f_0 + \Delta f \cdot \left( \sum_{l=h+1}^{w-1} 2^l \cdot b_l + 2 \cdot \sum_{l=0}^{h} 2^l \cdot b_l \right)$$

in $\Phi^0$, where $b_{w-1} \ldots b_0$ is the binary representation of i. The mapping $\Gamma_h$ is an increasing up-conversion according to related U.S. patent application Ser. No. 09/750,304 referenced above.

The inverse mapping of $\Gamma_h$ is also considered, which is denoted as $\Gamma_h^{-1}$. The mapping $\Gamma_h^{-1}$ maps some input frequency $$f_j = f_0 + \Delta f \cdot \left( \sum_{l=0}^{w-1} 2^l \cdot b_l \right)$$

in $\Phi^0$ to $$\Gamma_h^{-1}(f_j) = f_0 + \Delta f \cdot \left( \sum_{l=h+1}^{w-1} 2^l \cdot b_l + \frac{1}{2} \cdot \sum_{l=0}^{h} 2^l \cdot b_l \right)$$

in $\Phi^h$, where $b_{w-1} \ldots b_0$ is the binary representation of j. It is easy to see that the inverse mapping $\Gamma_h^{-1}$ is an increasing down-conversion according to related U.S. patent application Ser. No. 09/750,304 referenced above.

Assuming that for some frequency $f_i=f_0+i.\Delta f$ the binary representation of i is $b_{w-1} \ldots b_0$. The shuffle $a\sigma_h$ is implemented with the increasing frequency up-conversion mapping $\Gamma_h$ as follows:

1.) For any frequency $f_i$ such that $b_h=0$, $\sigma_h(f_i)=\Gamma_h(f_i)$; and
2.) For any frequency $f_i$ such that $b_h=1$, $\sigma_h(f_i)=\Gamma_h(f_i-2^h.\Delta f)+\Delta f$.

Similarly, the inverse shuffle $\sigma_h^{-1}$ is implemented with the increasing frequency down-conversion mapping $\Gamma_h^{-1}$ as follows:

1.) For any frequency $f_i$ such that $b_0=0$, $\sigma_h^{-1}(f_i)=\Gamma_h^{-1}(f_i)$; and
2.) For any frequency $f_i$ such that $b_{0=1}$, $\sigma_h^{-1}(f_i-\Delta f)+2.\Delta f$.

In related U.S. patent application Ser. No. 09/750,304 referenced above, it is described how to implement constrained increasing up-conversion or down-conversion mappings with $O(\log_2 W)$ wave-mixing converters. Overall, many interconnection networks may be built out of 2×2 elements, which either use butterfly or shuffle inter-stage connection patterns and have a logarithmic converter complexity. The theory of multi-log networks allows self-routing, non-blocking or rearrangeably non-blocking wavelength-interchangers to be designed in accordance with the present invention with a converter complexity of $O(F.(\log W)^n)$, where n is a small constant integer (typically 1,2,3) independent of the number of frequencies, and of the number of fibers. It is a significant improvement over previous designs with converter complexities of O(F.W).

I. All-Optical Wavelength Conversion

To give a brief overview of all-optical conversion techniques, it is noted that there are two major types of all-optical wavelength converters. The first type is based on optical gating, while the second type is based on wave-mixing effects in nonlinear media (see S. Yoo, "Wavelength-conversion technologies for WDM network applications", IEEE Journal of Lightwave Technology, vol. 14, pages 955–966, June 1996). These different devices are described below in more detail.

A. Optical Gating Converters

Optical gating converters include converters using cross-gain modulation in semiconductor optical amplifiers (see S. Yoo referenced above). They operate by translating signals carried on some input frequency to another frequency that plays the role of the pump, in the saturation regime of semiconductor optical amplifiers. These converters can only convert the carrier frequency of one input signal at a time. However, they can map different carrier frequencies to the same pump frequency. Referring to FIG. 1, there is shown an exemplary optical-gating wavelength converter 10 for translating an input signal carried on an input frequency, $f_{in}$, to an output signal with a carrier frequency equal to the pump frequency, i.e. $f_{out}=f^P$.

B. Wave-Mixing Converters

Figure 2:
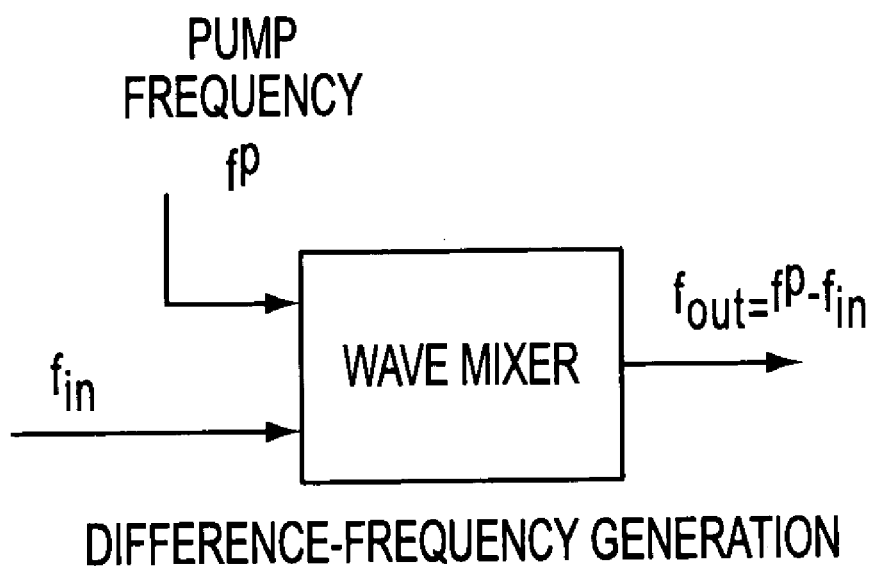
FIG. 2 shows a prior art wave-mixing wavelength converter based on difference-frequency generation.

Wave-mixing converters exploit nonlinear effects in appropriate medias such as optical fibers or semiconductor optical amplifiers. A variety of nonlinear effects exist including difference-frequency generation, and four wave-mixing (see S. Yoo referenced above). Converters of this type usually have a precise parametric relationship between the incoming frequencies, the pump and the outgoing frequencies. In the case of difference-frequency generation with some pump frequency $f^P$, an input frequency f is mapped to the output frequency $f^P-f$ (see FIG. 2, which shows a wave-mixing wavelength converter 20 based on difference-frequency generation). Major advantages of wave-mixing converters are their high level of transparency and their ability to simultaneously convert several input frequencies.

C. Frequency Shifters

For purposes of this detailed description, a frequency shifter may be any device that performs some frequency translation by some amount $\Delta$, where $\Delta$ is independent of the input frequency. Such a device maps any input signal on some carrier frequency f to another signal on the carrier frequency $f+\Delta$.

Figure 3:
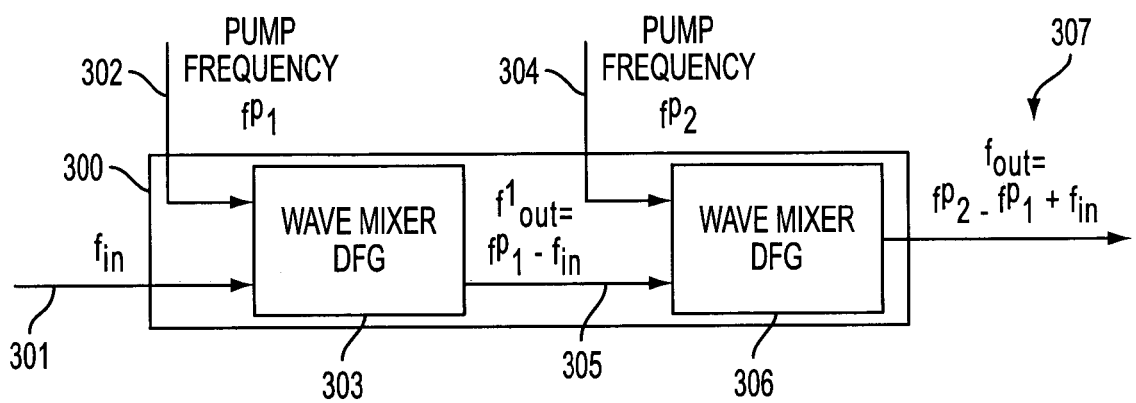
FIG. 3 shows a prior art frequency shifter wherein frequency translation is implemented with two cascaded difference-frequency generation devices.

Referring to FIG. 3, there is shown a frequency shifter 300 wherein frequency translation is implemented with two cascaded converters based on difference-frequency generation (DFG). That is, frequency shifter 300 comprises two cascaded difference-frequency generation wave-mixers 303 and 306 driven by different pump frequencies 302 and 304. Outgoing frequencies 307 are the result of the translation of incoming frequencies 301 by an amount equal to the difference of the pump frequencies in the second and the first wave-mixing devices.

II. Designs of All-Optical Cross-Connects

According to the placement of wavelength conversions in a switch, two classes of wavelength-interchanging cross-connects are distinguished. The first class of solutions provide wavelength conversion in a single stage, often the input or the output stage of a wavelength-selective cross-connect (see B. Ramamurthy et al. referenced above and K. Lee and V. Li, "A frequency-convertible optical network", IEEE Journal of Lightwave Technology, vol. 11, pages 962–970, May–June 1993). The second class of solutions perform wavelength conversions in several stages (see N. Antoniades referenced above). Single-stage approaches provide the best transmission performance at the expense of high converter costs, while multi-stage conversion architectures have poorer transmission performance, but require significantly fewer wavelength-converters.

A. Single-Stage Approach

Single-stage wavelength conversion is the most popular solution to design wavelength-interchanging cross-connects (see B. Ramamurthy referenced above). In this approach, the basic principle is to allocate a number of wavelength converters to the inputs or to the outputs of a wavelength-selective cross-connect (see B. Ramamurthy referenced above). This technique does not perform cascaded wavelength conversions on the switched optical signals. Therefore, it minimizes transmission impairments due to all-optical wavelength conversions. However, this method often requires large numbers of converters, and it results in high switch costs. When the number of converters is equal to the number of inputs or outputs, converters can be dedicated to inputs or to the outputs. Otherwise, the available converters must be shared among all channels. In the first case, an input/output dedicated converter solution is obtained (see B. Ramamurthy referenced above), while in the second case, an input/output shared converter solution is obtained (see K. Lee et al. referenced above and K. Lee and V. Li, "Optimization of a WDM optical packet switch with wavelength-converters", in Proceedings of IEEE INFOCOM'95, vol. 2, pages 423–430, April 1995). These two approaches are now described in more detail.

1. Input/Output Dedicated Wavelength Conversion

Input (or output) dedicated wavelength conversion assigns a wavelength-converter to each input (or output) of a wavelength-selective cross-connect. In a system with F fibers, and W wavelengths per fiber, this approach requires a total number of converters equal to F.W. In this technique, the blocking performance of the cross-connect directly depends on the conversion range of the converters, and on the blocking performance of the wavelength-selective cross-connect that are used. When the wavelength-selective cross-connect is strictly non-blocking, and the converters have full-range (i.e., they can change the frequency of any incoming signal to any other frequency) a strictly non-blocking wavelength-interchanging cross-connect is obtained.

Figure 4:
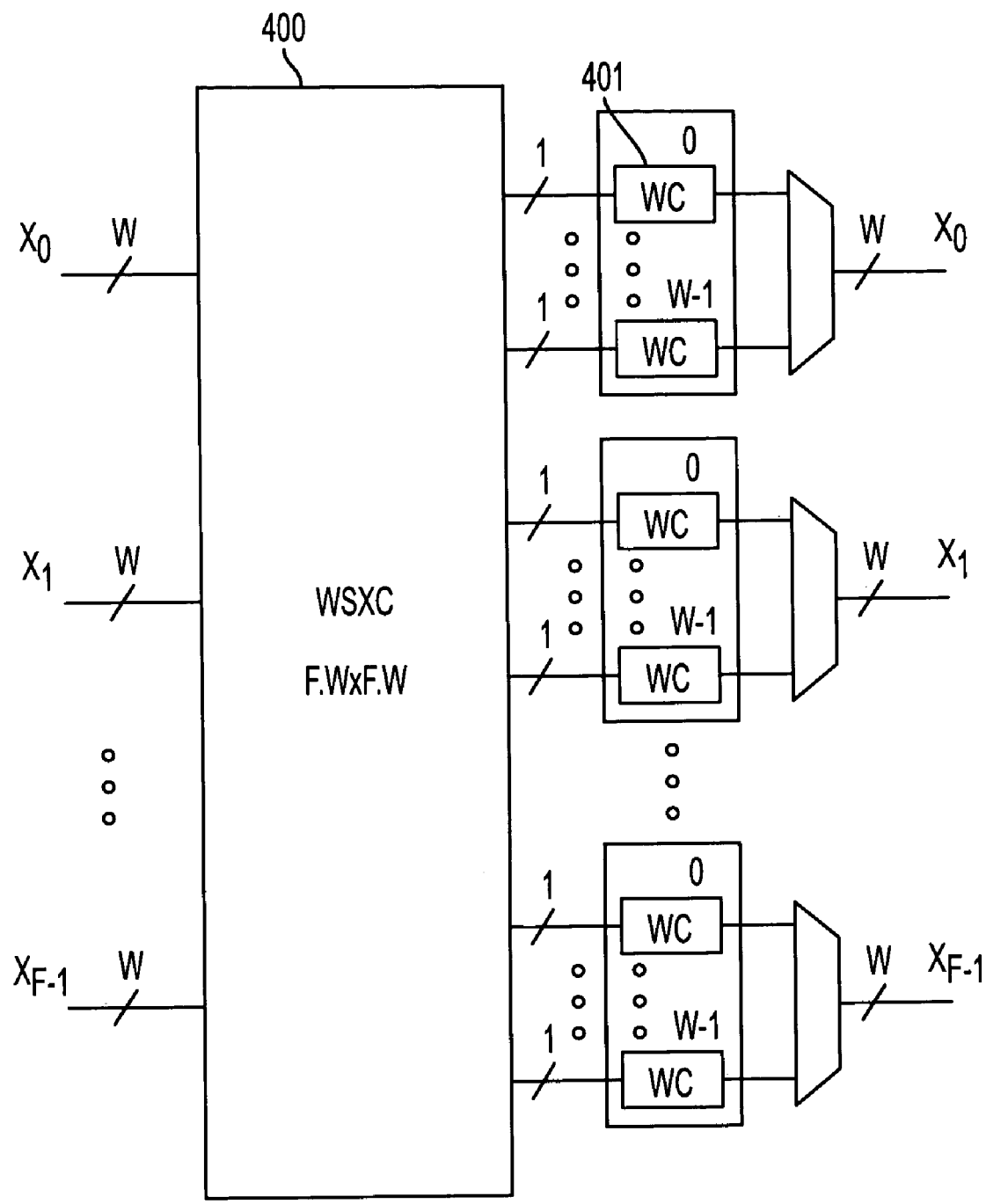
FIG. 4 shows a prior art wavelength-interchanging cross-connect based on output-dedicated full-range wavelength converters.

Referring to FIG. 4, there is shown the generic architecture of a wavelength-interchanging cross-connect based on output-dedicated wavelength-converters. A central wavelength-selective cross-connect 400 performs the function of space-switching, while dedicated converters like 401 provide wavelength-conversion.

2. Input/Output Shared Wavelength Conversion

Large converter requirements have prompted the development of input (or output) shared wavelength converters, where a number of inputs (or outputs) of a wavelength-selective cross-connect share a converter pool that contains a number of converters strictly smaller than the number of inputs (or outputs) (see K. Lee et al. referenced above). In this case, a routing and frequency assignment algorithm allocates converters from the pool to minimize the blocking probability of the cross-connect. Empirical results suggest that in certain network scenarios, there is a quick saturation in the improvement of the blocking probability, when the number of shared converters exceed certain thresholds (see K. Lee et al. referenced above). In other words, a small number of shared converters may provide most of the benefits of wavelength-conversion.

Figure 5:
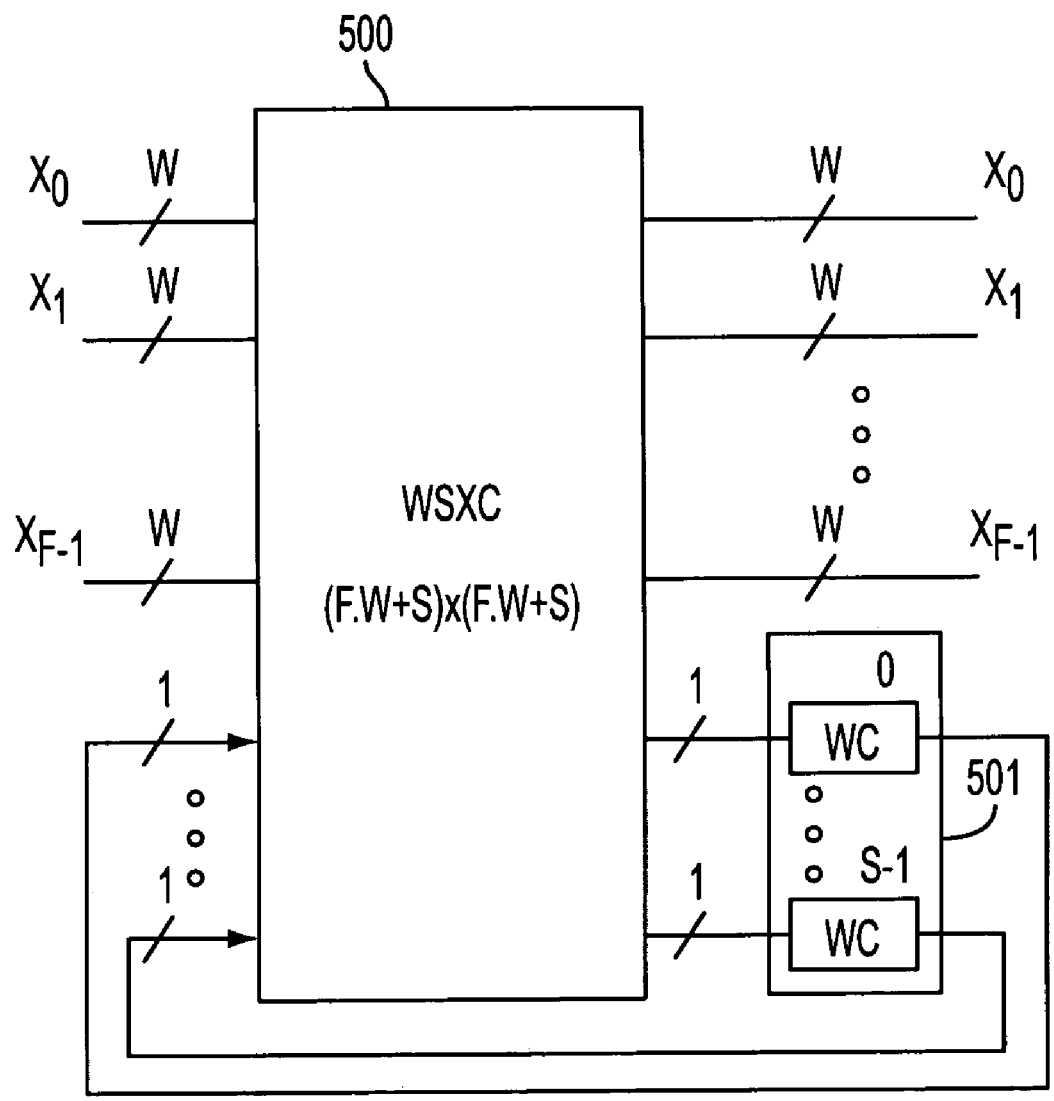
FIG. 5 shows a prior art wavelength-interchanging cross-connect with output-shared full-range wavelength converters.

Referring to FIG. 5, there is shown a the generic architecture of a wavelength-interchanging cross-connect based on input/output shared wavelength-converters. The central wavelength-selective cross-connect 500 provides two functions. First it switches channels in the space division. Second, when required the optical space switch 500 directs channels to one of the shared converters in the pool 501. The converted channels are also switched to their output fibers by the central cross-connect 500.

In spite of the above-mentioned advantages, many questions remain about designs based on single-stage shared wavelength-conversion. First, there is little knowledge about the precise quantitative relationship between the blocking probability, the number of shared converters, and the particular routing and frequency assignment algorithm used by the wavelength-interchanging cross-connect. Second, single-stage shared converters have been mostly designed for wavelength division multiplexing access networks, and they do not provide a way to generate interconnection with desirable blocking properties (i.e., self-routing, non-blocking, rearrangeable or wide-sense non-blocking).

B. Multi-Stage Approach

Unlike single-stage methods, multi-stage techniques perform several intermediate wavelength conversion operations. Until the development of wave-mixing converters with bulk channel conversion capacities (see S. Yoo referenced above), multi-stage wavelength conversion was not a practical technique. Wave-mixing converters are still in their experimental phase, but earlier studies have already shown how these devices can help the design of rearrangeably non-blocking wavelength-interchanging cross-connects (see N. Antoniades et al. referenced above).

Figure 6:
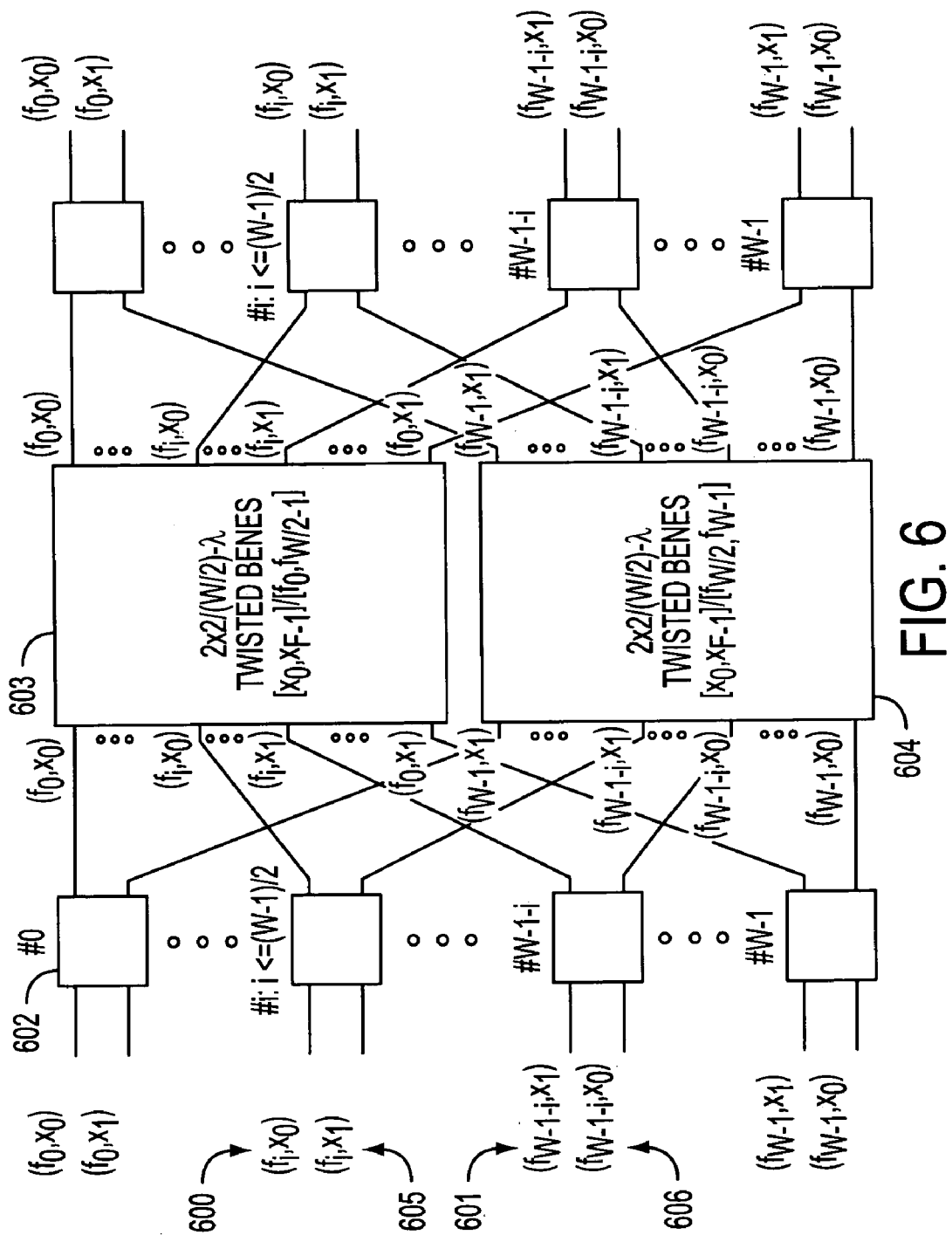
FIG. 6 shows a logical recurrence for a $2\times2/W-\lambda$ twisted Benes wavelength-interchanging cross-connect.

To design an optical cross-connect with F fibers and w frequencies per fiber, which can be denoted by $F \times F/W-\lambda$, a recursive construction of Benes switches is used, as shown in FIG. 6. In a multi-frequency multi-fiber system, a channel is denoted by $(f_i, x_j)$, where the channel frequency is $f_i$ and its fiber is $x_j$. For a system with F=2 fibers and W frequencies per fiber, this method comprises assigning the wavelength channels to each switch element 602 of the first and last stages as follows:

1.) For each switch element i, where $i \leq (W-1)/2$: channel $(f_i, x_0)$ 600 is assigned to each top inlet or outlet of the switch element, while channel $(f_i, x_1)$ 605 is assigned to each bottom inlet or outlet of the same element.

2.) For each switch element i, where $i \leq (W-1)/2$: channel $(f_{W-1-i}, x_1)$ 601 is assigned to each top inlet or outlet of the switch element, while channel $(f_{W-1-i}, x_0)$ 606 is assigned to each bottom inlet or outlet of the same element.

Each switch element in the first (or last) stage connects by its top outlet (or inlet) to a top $2 \times 2/(W/2)$-$\lambda$ Benes middle stage switch 603, and by its bottom outlet (or inlet) to a bottom $2 \times 2/(W/2)$-$\lambda$ Benes middle stage switch 604. The design of both middle stage switches is known (see N. Antoniades et al. referenced above).

The top middle stage switch 603 processes the frequencies in the interval $[f_0, f_{W/2-1}]$ for all the incoming fibers, while the bottom middle stage switch 604 processes the frequencies in the interval $[f_{W/2}, f_{W-1}]$ for all the incoming fibers.

Figure 7:
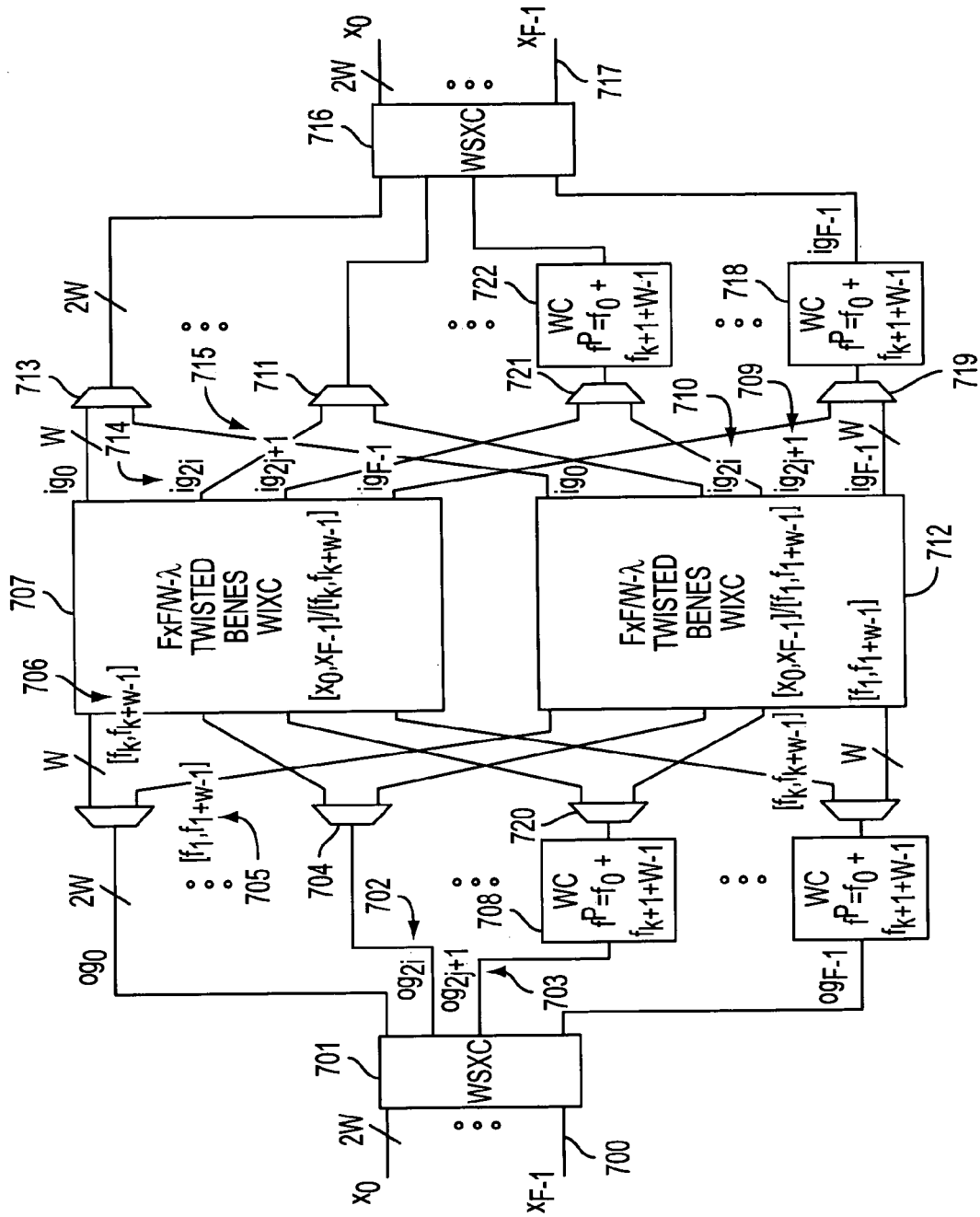
FIG. 7 shows a recursive construction of a $[x_0, x_{F-1}]/[f_k, f_{k+W-1}], [f_1, f_{l+W-1}]$ twisted Benes wavelength-interchanging cross-connect.

Referring to FIG. 7, there is shown a recursive construction of a $[x_0, x_{F-1}]/[f_k, f_{k+W-1}], [f_l, f_{l+W-1}]$ twisted Benes wavelength-interchanging cross-connect. Assumed is a cross-connect with F fibers named $x_0, x_1, \ldots x_{F-1}$ such as 700, each supporting two disjoint sets of W frequencies that are in the intervals $[f_k, f_{k+W-1}]$ and $[f_l, f_{l+W-1}]$ such that $k+W-1$ is strictly smaller than l. Each of the F input fibers connects to a first wavelength-selective cross-connect (WSXC) 701 that switches each incoming wavelength channel to any of 2W.F output channels. The outputs of the wavelength-selective cross-connect (WSXC) 701 are grouped into F groups of size 2W corresponding to different fibers like 702 and 703, such that outputs of a given group are assigned distinct frequencies. The different output groups obtained from cross-connect 701 are labeled from 0 to F−1, and called $og_0, og_1, \ldots og_{F-1}$. Channels in output groups with even indexes such as 702 are directly sent to a frequency demultiplexer 704 dedicated to their output group, while channels in output groups with odd indexes such as 703 are first sent to a difference-frequency generation converter (WC) 708 with pump frequency $f_0 + f_{k+l+W-1}$. The wavelength-converter 708 is dedicated to the output group 703. Then the converted wavelength channels (from output group 708) are sent to a frequency demultiplexer 720 also dedicated to the output group of the wavelength channels. Each frequency demultiplexer dedicated to an output group $og_i$ separates the incoming wavelength channels into a first set 706 equal to $[f_k, f_{k+W-1}]$ and a second set 705 equal to $[f_l, f_{l+W-1}]$. Demultiplexed channels in sets of the type of 706 are sent to the inputs of an F×F/W-$\lambda$ Benes type wavelength-interchanging cross-connect (WIXC) 707, that supports the frequency set $[f_k, f_{k+W-1}]$ for each of its F fiber inputs. Demultiplexed channels in sets of the type of 705 are sent to the inputs of an F×F/W-$\lambda$ Benes type wavelength-interchanging cross-connect (WIXC) 712, that supports the frequency set $[f_l, f_{l+W-1}]$ for each of its F fiber inputs. The W.F outputs of each of the F×F/W-$\lambda$ wavelength-interchanging cross-connects are grouped into F groups of size W (714, 715), such that outputs in the same group have distinct frequencies. Such groups are called input groups, and for each F×F/W-$\lambda$ switch they are labeled $ig_0, ig_1, \ldots ig_{F-1}$. Input groups having the same index $i=0, \ldots, F-1$, in both F×F/W-$\lambda$ switches are merged through a dedicated multiplexer such as 711 or 721. Multiplexers such as 711 merge corresponding input groups (e.g. 714 and 710 for an even group, 715 and 709 for an odd group) with even indexes and send their outputs directly to a second wavelength-selective cross-connect (WSXC) 716. Multiplexers like 721 merge corresponding input groups with odd indexes and then send their outputs to a difference-frequency generation converter (WC) 722 having a pump frequency equal to $f_0 + f_{l+k+W-1}$. The converted channels are then sent from the converter 722 to the wavelength-selective cross-connect (WSXC) 716. The wavelength-selective cross-connect (WSXC) 716 switches each of the individual incoming wavelength channels onto the proper outgoing fiber such as 717.

The multi-stage method described above enables the design of rearrangeably non-blocking wavelength-interchanging cross-connects, which require at most F.W/2 single or dual pump difference-frequency generation converters, instead of twice that number as would be obtained with other approaches. Therefore, significant gains are obtained by using this multi-stage approach.

The benefits of the above-described multi-stage method are counter-balanced by drawbacks inherent to the rearrangeably non-blocking nature of the switch. Indeed, it is impractical to consider rerouting ongoing optical circuits because of the high volumes of traffic carried by the circuits and of the absence of all-optical buffers. To guarantee the quality of service of optical circuits, a better solution is to consider strictly non-blocking cross-connects or wavelength interchangers. A natural approach to build strictly non-blocking switches is the vertical replication of given rearrangeably non-blocking switches. For example, the Cantor network is a strictly non-blocking interconnection which is built by vertically stacking $\log_2 M$ copies M×M Benes networks, where M is the size of the Cantor network. When the vertical stacking philosophy is applied to the above-described multi-stage method for a cross-connect with F fibers, and W frequencies per fiber, a strictly non-blocking frequency-interchanging cross-connect is obtained with a converter complexity of $F.W.\log_2(F.W)/2$. When F.W the total number of wavelength channels is strictly larger than 4, the converter complexity is larger than the complexity of the previously discussed dedicated converter solutions. To overcome this problem, a new technique is needed to design wavelength-interchanging cross-connects, with smaller converter requirements.

III. Present Invention Solution

The benefits of the above-described solutions provide a motivation to investigate other architectures based on multi-stage wavelength-conversions, and on wave-mixing converters. However, the present invention technique differs from these existing solutions in many respects. First, a three-stage separable space-wavelength switching approach is considered, where switching is first in the wavelength domain, then in the space dimension, and then again in the wavelength domain. In previous described solutions, a joint technique is used where channels are simultaneously switched in all domains, at each stage. A second major difference is a new space-wavelength transformation that is more intuitive than those described above. Thirdly, a set of new devices is presented based on wave-mixing frequency-shifters, which enable the translation of the present invention space-wavelength transformation into physical implementations at logarithmic converter costs. In the following sections, a WDM system with $W=2^w$ optical frequencies of the form $f_i = f_0 + i.\Delta f$ is assumed.

A. Separable Space-Wavelength Switches

Figure 8:
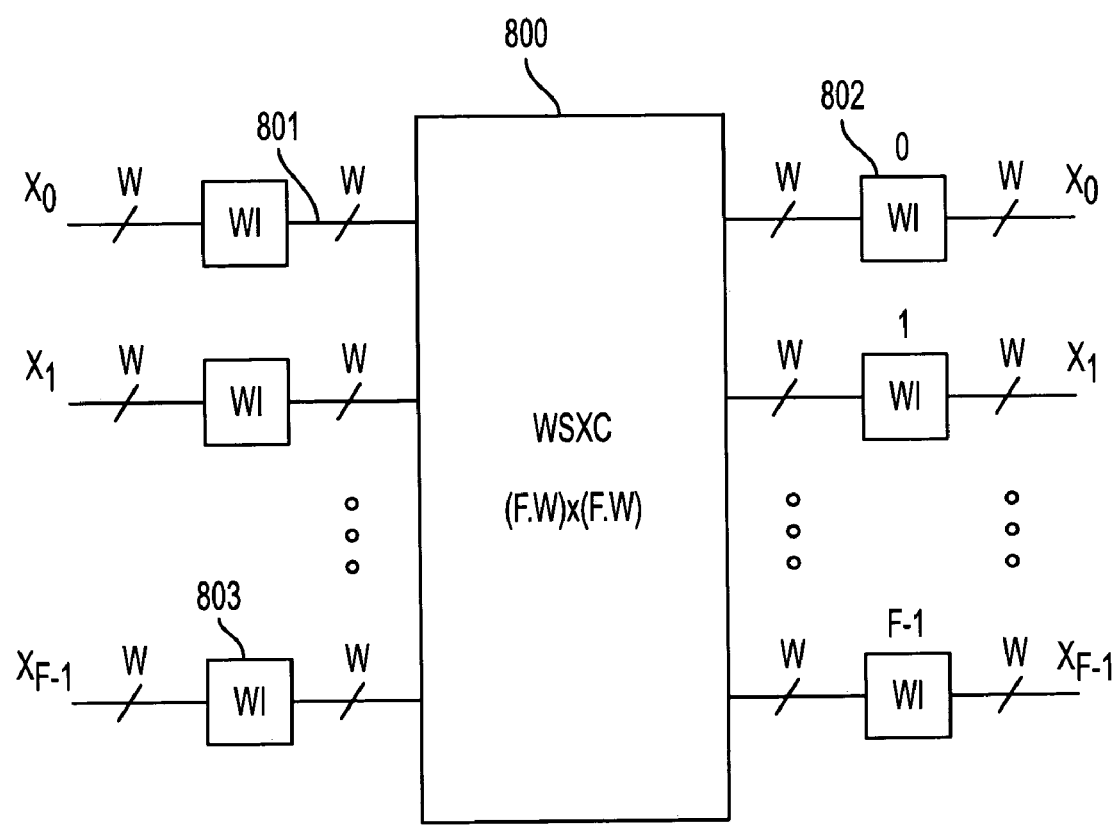
FIG. 8 shows a separable space-wavelength switch in accordance with the present invention.

A separable space-wavelength switch does not switch channels in the space and wavelength domains simultaneously. Such a wavelength-interchanging cross-connect usually comprises a space-switch equipped with wavelength interchangers (WI) located at its input or at its outputs, as shown in FIG. 8. That is, FIG. 8 shows a separable space-wavelength switch wherein F incoming fibers 801 each carry W wavelength channels. Individual space-wavelength channels are switched by the wavelength-selective cross-connect (WSXC) 800. Wavelength interchangers (WI) like 802 and 803 are dedicated to each input/output fiber and provide frequency permutations of the incoming or outgoing channels.

The advantage of this approach is to reduce the impact of problems related to wavelength conversion on the overall design of the cross-connect. The current market evolution suggests that separable switches offer the smoothest evolution path towards fully wavelength convertible networks. Indeed, the processes to manufacture large space switches are mature and cost-efficient. All-optical cross-connects without wavelength-interchanging capabilities are now commercially viable, and offer definite advantages when it comes to switching large numbers of space-wavelength channels. However, for all-optical wavelength converters, manufacturing processes are still in their early stages. For this reason all-optical wavelength conversion is an expensive option that few service providers are willing to use at first. The problem is more important in the metropolitan area, where most of the future growth of optical networks is to occur. In metropolitan area networks, the severity of the problem is increased because service providers are highly sensitive to initial costs. Separable space-wavelength switches give service providers more flexibility to manage network costs, and to upgrade their network nodes to full frequency convertibility, through the introduction of wavelength interchangers when it is most appropriate.

The class of separable wavelength-interchanging cross-connects includes switches that use atomic wavelength conversions of channels, and dedicated wavelength converters, at inputs or outputs. However, wavelength interchangers that are internally based on multi-stage wavelength conversions may also be used. A natural step is to consider wavelength interchangers obtained by simplification of the above-described methods. In this case, a naïve technique is to use a 2×2/W–λ twisted Benes switch, where only half of the inputs or outputs provided by the network are used (i.e., only W of them). But this particular solution leads to rearrangeably non-blocking wavelength interchangers with a converter complexity of W. Therefore, no benefit is obtained and better techniques need to be devised. Such better techniques will now be described in the following sections. That is, new cost-effective multi-stage wavelength interchangers based on wave-mixing converters are described below in accordance with the present invention.

B. New Transformation

The present invention provides a new frequency-space transformation. This new frequency-space transformation is applicable to partially or to fully connected interconnection networks. The transformation simply consists of labeling some inlet or outlet i of any switching stage with the carrier frequency $f_{i \bmod W}$. In spite of the generality of the transformation, this detailed description focuses on the following types of network topologies:

1.) Self-routing networks built out of 2×2 elements, (see A. Pattavina referenced above); and
2.) Rearrangeable or strictly non-blocking multi-log networks built by horizontal or vertical replication of self-routing networks (i.e., multi-log networks) (see A. Pattavina referenced above, and D. Shy, and C. Lea, "Log$_2$ (N,m,p) strictly nonblocking networks", IEEE Transactions on Communications, vol 39, pp. 1502–1510, October 1991).

1. Self-Routing Networks

A self-routing interconnection network provides a unique path for any input-output pair. Banyan type networks form a large subclass within the set of self-routing interconnection topologies. A Banyan type self-routing network of size N usually has n=log$_2$ N consecutive stages, where each stage contains N/2 2×2 switching elements. The inlets and outlets of adjacent stages are connected to one-another by specific inter-stage connection patterns. To describe these patterns, assume that the inlets and outlets of each stage are numbered from 0 to N−1, and the index of each inlet or outlet is described by its binary representation over log$_2$ N digits. Then, it is possible to describe Banyan type inter-stage connection patterns as follows:

1.) Butterfly pattern $\beta_h$, $1 \leq h \leq n-1$: some outlet i with binary representation $b_{n-1} \ldots b_{h+1} b_h b_{h-1} \ldots b_0$ connects to inlet j with binary representation $b_{n-1} \ldots b_{h+1} b_0 b_{h-1} \ldots b_h$ in the next switching stage.
2.) Shuffle pattern $\sigma_h$, $1 \leq h \leq n-1$: some outlet i with binary representation $b_{n-1} \ldots b_{h+1} b_h b_{h-1} \ldots b_0$ connects to inlet j with binary representation $b_{n-1} \ldots b_{h+1} b_{h-1} \ldots b_0 b_h$ in the next switching stage.
3.) Inverse shuffle pattern $\sigma_h^{-1}$, $1 \leq h \leq n-1$: some outlet i with binary representation $b_{n-1} \ldots b_{h+1} b_h b_{h-1} \ldots b_0$ connects to inlet j with binary representation $b_{n-1} \ldots b_{h+1} b_0 b_h \ldots b_1$ in the next switching stage.
4.) The identity pattern j maps any outlet to the inlet with the same index in the next stage.

Referring to FIG. 25, there is provided a table of common self-routing networks wherein the type of permutation used at each stage is described. That is, in the table of FIG. 25, a notation of the type P(h) indicates the pattern used between stage h and stage h+1. P(O) and P(n) are the permutations that are respectively applied to the inputs and to outputs of the interconnection network.

Figure 9:
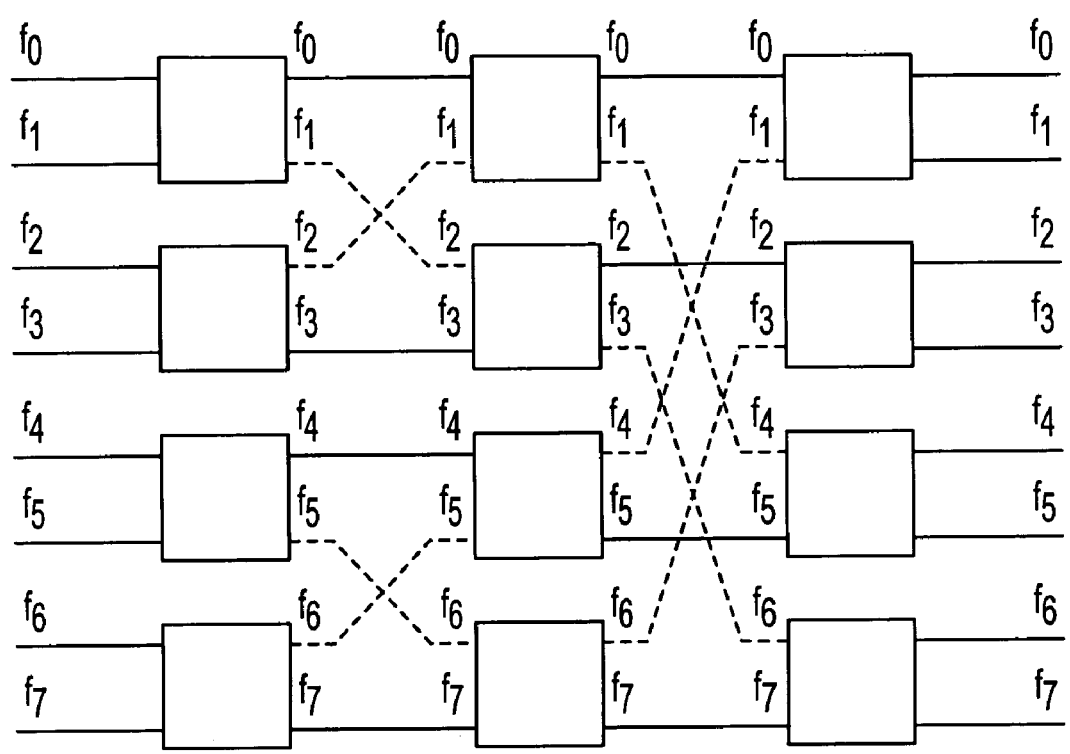
FIG. 9 shows an 8×8 self-routing SW-Banyan topology in accordance with the present invention.

When the present invention transformation is applied to Banyan type self-routing networks, distinct frequencies are assigned to each row of inlets and outlets in the switch. FIG. 9 shows an example of this transformation for a SW-Banyan network. That is, FIG. 9 shows an 8×8 self-routing SW-Banyan topology. As can be seen from FIG. 9, each switching element 900 switches two adjacent frequencies, and inter-stage connections also involve some amount of wavelength conversion. In the example of FIG. 9, the dashed grey lines represent the logical inter-stage connections that imply wavelength conversion. Thus, the following general conclusions may be drawn when the present invention transformation is applied to partially connected networks with an identical number of inlets and outlets in each stage:

1.) Each switching element switches a set of distinct frequencies. In a given stage, the different frequency sets assigned to the switching elements form a partition of the frequency spectrum; and
2.) Some inter-stage connections require wavelength conversions.

In the following section, some background is provided on multi-log networks.

2. Multi-Log Networks

Figure 10:
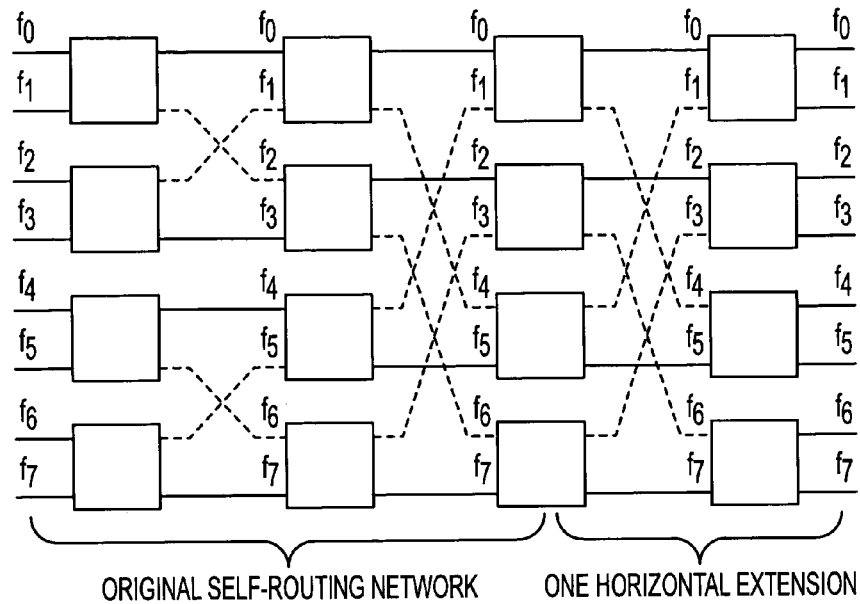
FIG. 10 shows the application of the present invention transformation to networks based on horizontal extensions of an 8×8 self-routing SW-Banyan network.
Figure 10:
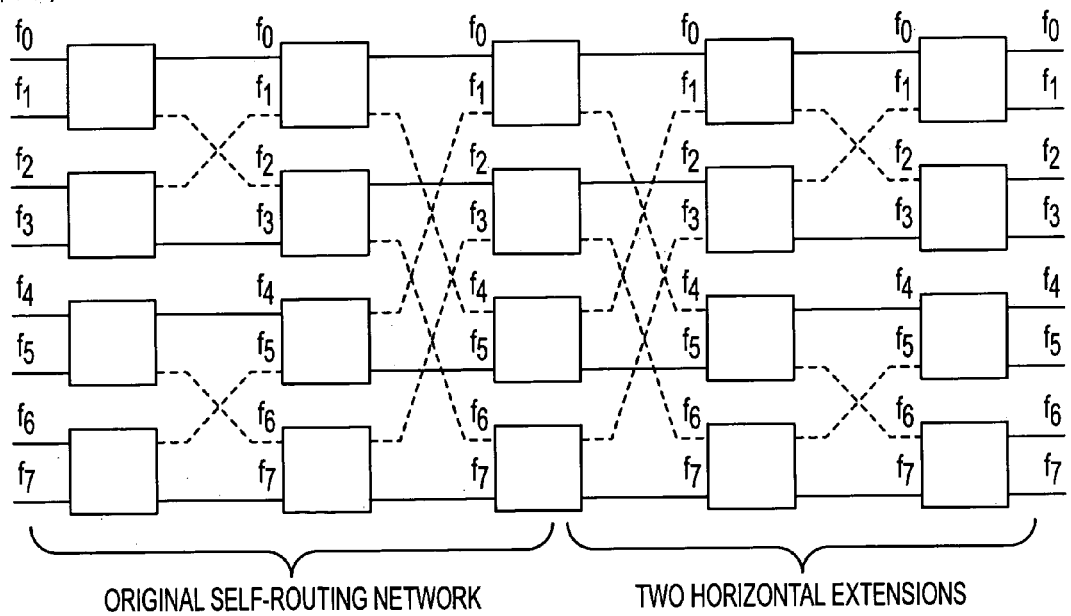

Self-routing networks are interesting when they allow distributed high-performance routing in packet switches. However, they suffer from blocking. Two techniques are available to address this problem. The first technique is named horizontal extension, and it consists in appending additional stages (see A. Pattavina referenced above). These stages are obtained by mirroring some of the stages of the original self-routing network. The Benes network is a good example of this technique, and it is obtained by the horizontal extension of the reverse Baseline network with its last $\log_2 N-1$ stages, where the size of the switch is N×N. FIG. 10 shows the application of the present invention transformation to networks based on horizontal extensions of an 8×8 self-routing SW-Banyan network.

The second technique is called vertical replication (also see A. Pattavina referenced above). Its principle is to stack identical copies of some partially connected network that may be a self-routing network, or a modification of such a network through the technique of horizontal extension. An example of application of the method of vertical replication is the Cantor network that is obtained by vertically stacking $\log_2 N$ copies of N×N Benes networks. When horizontal extension and vertical replication are combined, self-routing networks can be transformed into topologies belonging to the general class of multi-log networks. Multi-log networks are also called $\log_2(N,m,p)$ networks, where N is the size of the network, m is the number of stages appended to the original self-routing network, and p is the number of vertically stacked copies. The blocking properties of $\log_2(N,m,p)$ networks are given by two fundamental results:

1.) A $\log_2(N,m,p)$ network is rearrangeably non-blocking if $$p \geq 2^{\frac{n-m}{2}},$$

where $n = \log_2 N$

2.) A $\log_2(N,m,p)$ network is strictly non-blocking if $$p \geq \begin{cases} \frac{3}{2} \cdot 2^{\frac{n-m}{2}} + m - 1, & n+m \text{ even} \\ 2^{\frac{n-m+1}{2}} + m - 1, & n+m \text{ odd} \end{cases}, \text{ where } n = \log_2 N.$$

When p=1, a stronger result is obtained concerning $\log_2$(N, m, 1) networks built out of SW-Banyan self-routing networks. It states that these networks become rearrangeably non-blocking if m=n−1.

The present invention transformation may also be applied to $\log_2$(N, m, p) networks. When we have only one copy (p=1), the resulting logical network has the same characteristics as in the case of self-routing networks:

1.) Each switching element switches a set of distinct frequencies. In a given stage, the different frequency sets assigned to the switching elements form a partition of the frequency spectrum; and
2.) Some inter-stage connections require wavelength conversions.

Figure 11:
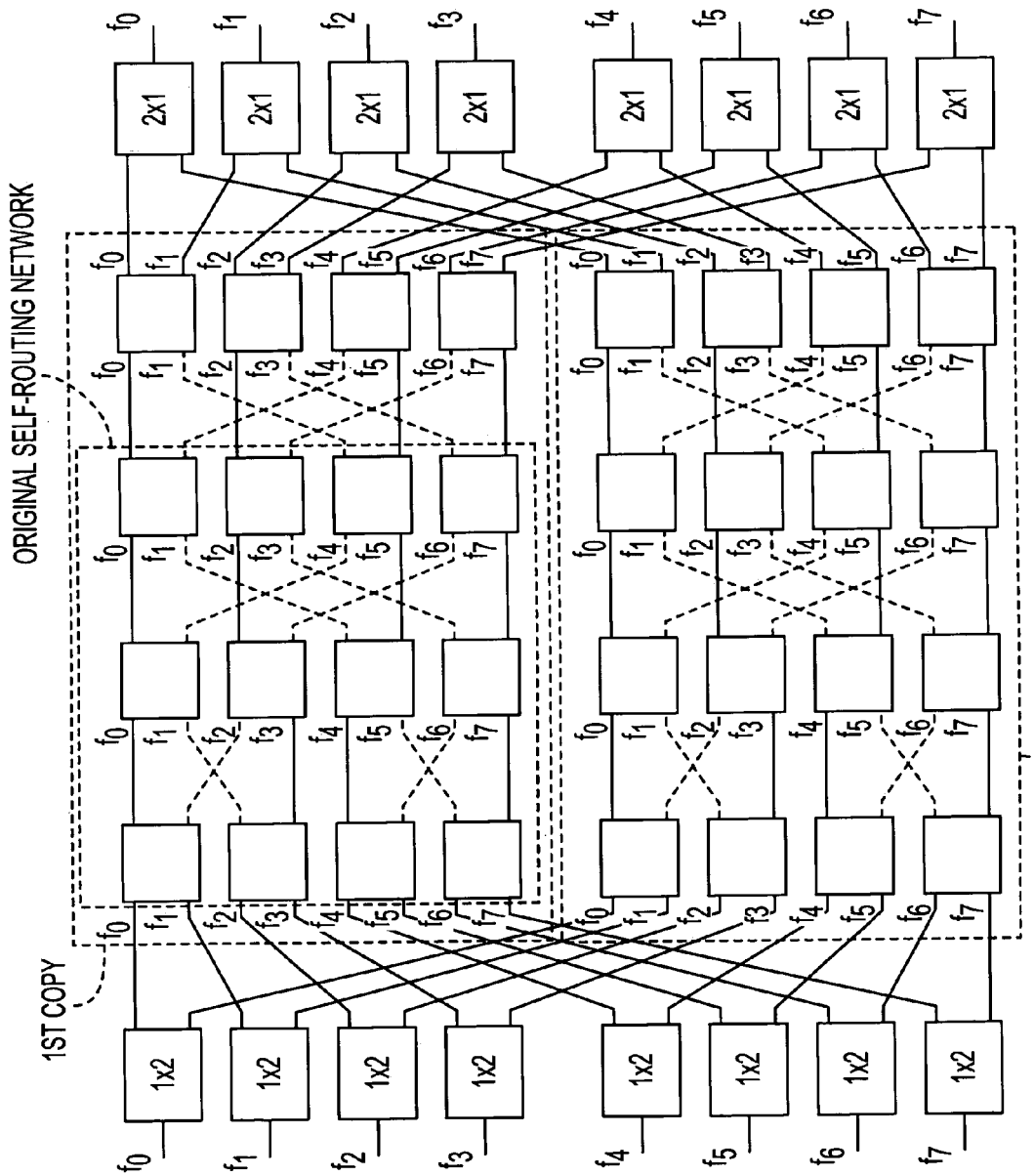
FIG. 11 shows the application of the present invention transformation to a $\log_2(8,1,2)$ network based on an 8×8 SW-Banyan network.

When at least two copies (p>1) are present, an important difference resides in the fact that in some stages as many as p different inlets or outlets may be assigned the same frequency. FIG. 11 shows the application of the present invention transformation to a $\log_2(8,1,2)$ network based on an 8×8 SW-Banyan network.

C. Implementation of Self-Routing Wavelength Interchangers

As described above, when applying the present invention wavelength-to-space transformation to a self-routing network, a logical topology is obtained where logical 2×2 elements switch two signals carried on two adjacent frequencies, and inlets and outlets assigned possibly different frequencies are connected by the inter-stage connection patterns. These two characteristics of the present invention transformation both imply the use of wavelength conversion to provide the two following functions:

1.) Definition of the states of the switching elements. In the bar state individual elements need not modify the frequencies of incoming signals. But in the cross state, the frequencies of incoming signals must be swapped.
2.) Inter-stage connections: When an inlet assigned a first frequency in a given stage connects to an outlet assigned a second frequency in the following stage, such that the two frequencies are different, the frequency of the signal coming from the inlet must be converted to the frequency assigned to the outlet.

Thus, a generic implementation for self-routing wavelength interchangers is proposed in accordance with the present invention, where these two types of wavelength conversion needs are separately considered. This separation allows for a more intuitive and modular design. Then converter requirements for the different types of conversion needs may be optimized separately.

Wavelength conversions corresponding to changes in the states of switching elements are provided by a new device called a state changer. In a given stage, the state changer is shared by all switching elements. The only function of the state changer is to change the frequency of incoming signals as follows:

1.) From $f_{2i}$ to $f_{2i+1}$ for signals on a carrier frequency with an even index;
2.) From $f_{2i+1}$ to $f_{2i}$ for signals on a carrier frequency with an odd index.

The wavelength conversions required for inter-stage connections are implemented by another type of device called an inter-stage connection module. Both state changers and inter-stage connection modules provide predetermined frequency mappings, regardless of the state of the switch. In other words, signals on some given input carrier frequency are always moved to the same output carrier frequency by state changers and inter-stage connection modules, although these two modules may select different output carrier frequencies for the same input carrier frequency. In the case the state changer, the predetermined frequency mapping always maps each even frequency to the higher adjacent odd frequency, and each odd frequency to the smaller adjacent even frequency. In the case of interstage connection modules, the predetermined frequency mapping is fixed and based upon the interstage connection pattern provided by the module.

Figure 12:
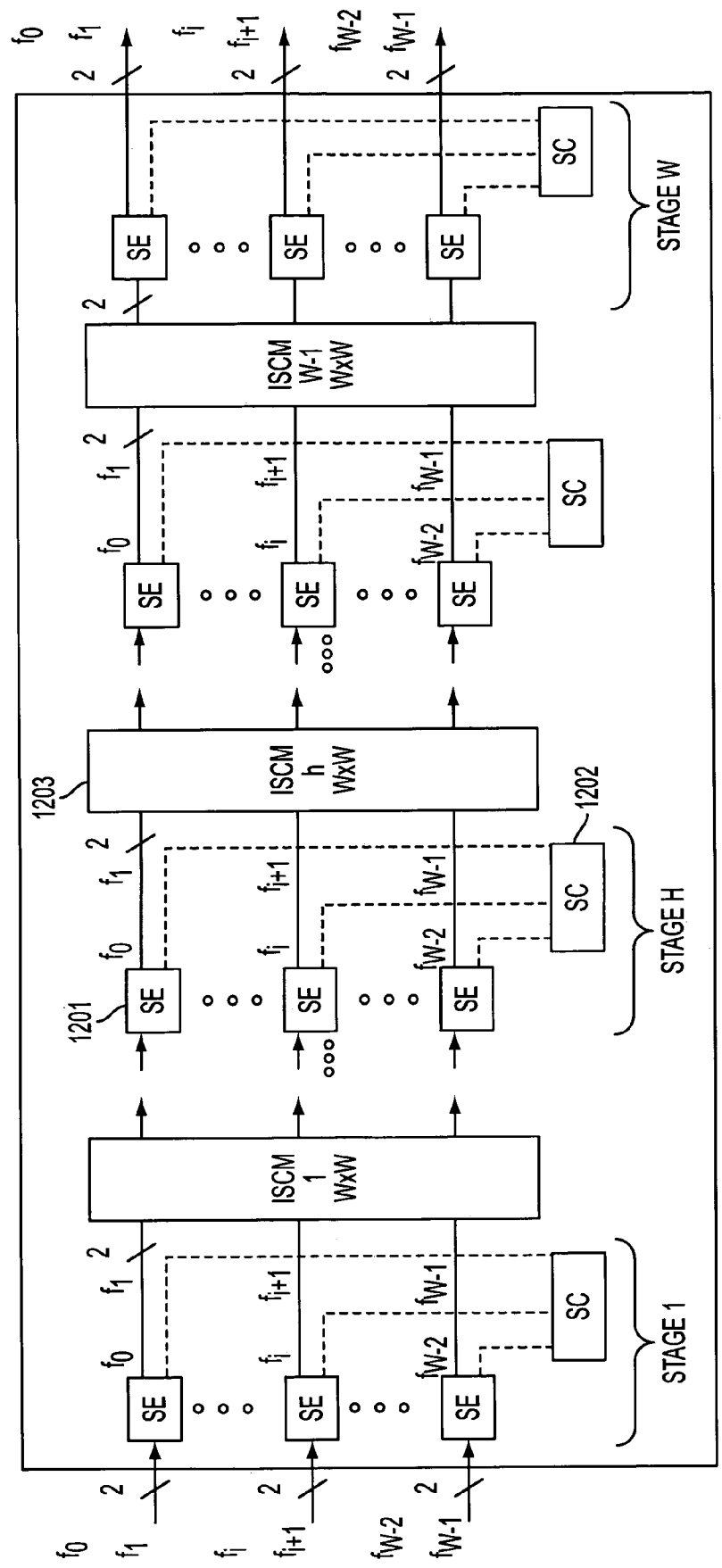
FIG. 12 shows a generic implementation of a wavelength interchanger in accordance with the present invention.

Referring to FIG. 12, there is shown a generic implementation of a self-routing wavelength interchanger according to the above description thereof. The overall architecture of this interchanger comprises $w=\log_2 W$ stages. At some stage h, each of the W/2 2×2 switching elements (SE) such as 1201 receives signals on two adjacent carrier frequencies from a previous stage, and sends the same signals to an inter-stage connection module (ISCM) 1203. In any stage, the i-th switching element (SE) receives signals on the carrier frequencies $f_{2i}$ and $f_{2i+1}$, where $0 \leq i \leq W/2-1$. Also, in each stage, all switching elements connect to a state changer (SC) 1202. As mentioned above, in a given stage, the state changer (SC) enables changes in the switching states of elements by swapping the carrier frequencies of signals switched by a common element. In FIG. 12, the specific topology implemented by the architecture depends on the nature of the frequency permutation implemented by the inter-stage connection modules.

Figure 13:
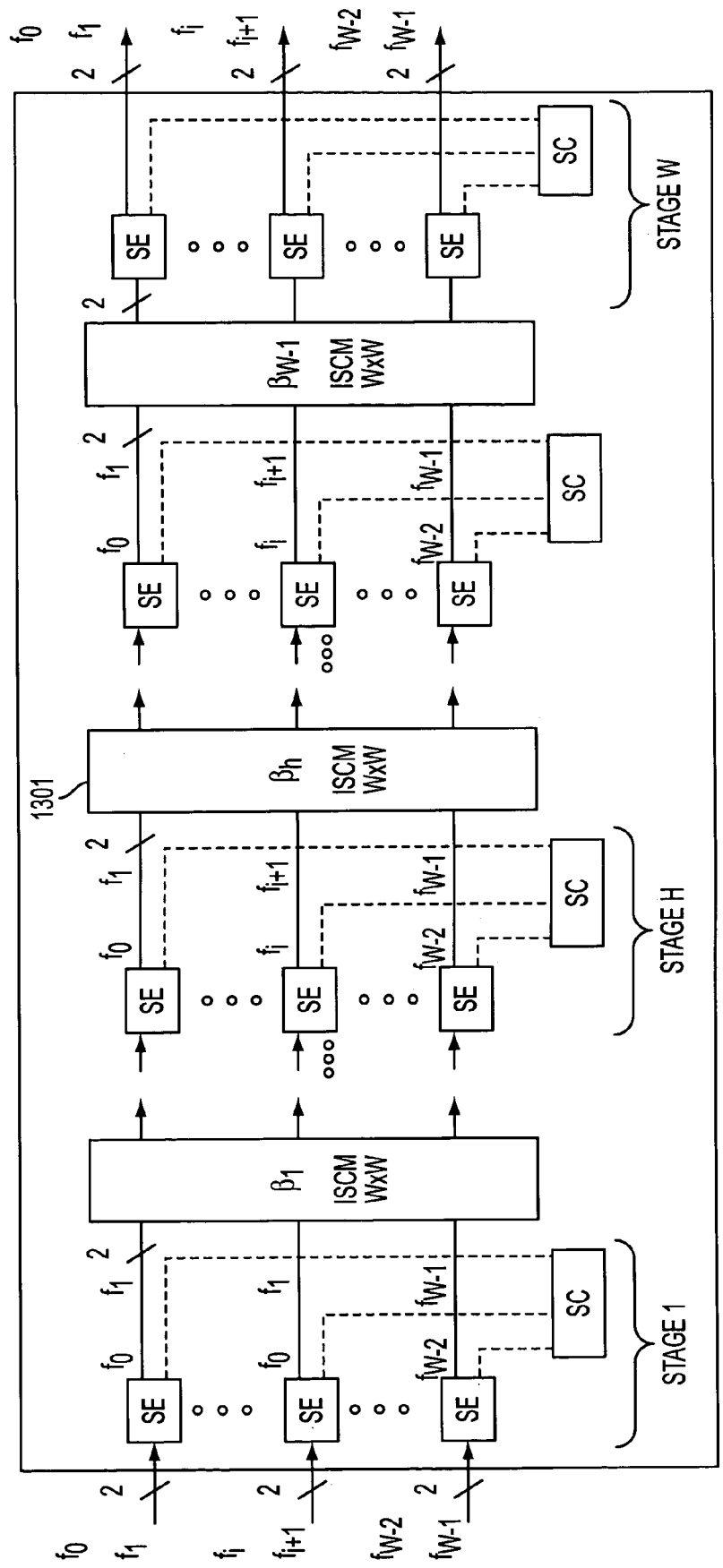
FIG. 13 shows an implementation of a SW-Banyan self-routing wavelength interchanger in accordance with the present invention.

The implementation of a SW-Banyan self-routing wavelength interchanger is shown in FIG. 13. In this implementation, it can be seen that the frequency permutation in some stage $h \leq w-1$ is the butterfly permutation $\beta_h$, as shown in inter-stage connection module (ISCM) 1301. This is consistent with the above description of the SW-Banyan self-routing network in the table of FIG. 25.

After providing generic designs for wavelength interchangers, it is now appropriate to propose efficient ways to implement state-changers, and inter-stage connection modules, with few converters.

1. Switching Elements

Figure 14:
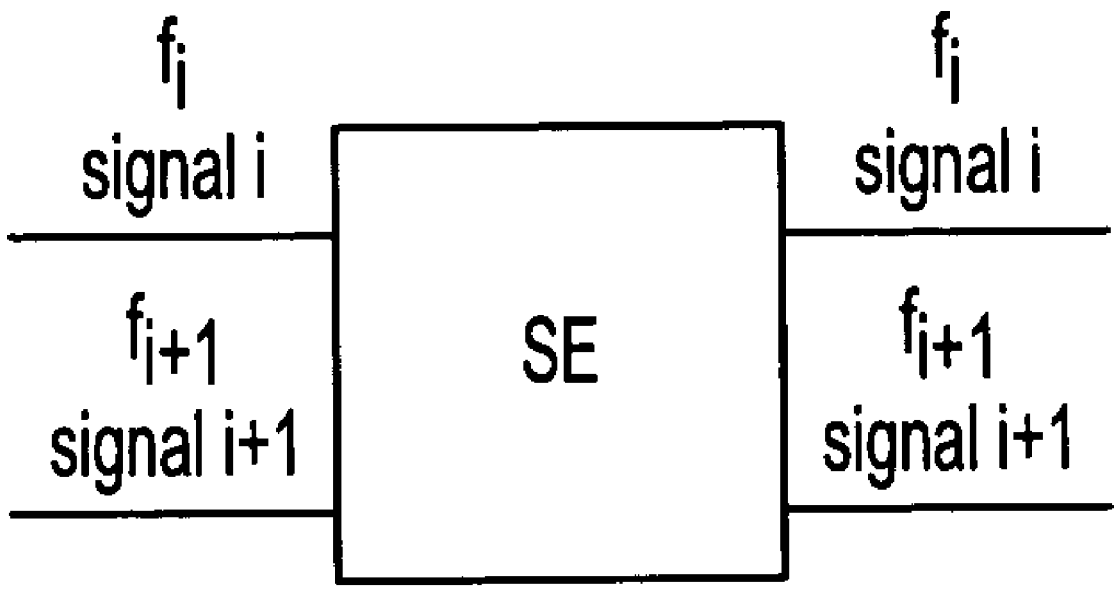
FIG. 14 shows the switching states of a 2×2 switching element in accordance with the present invention.
Figure 14:
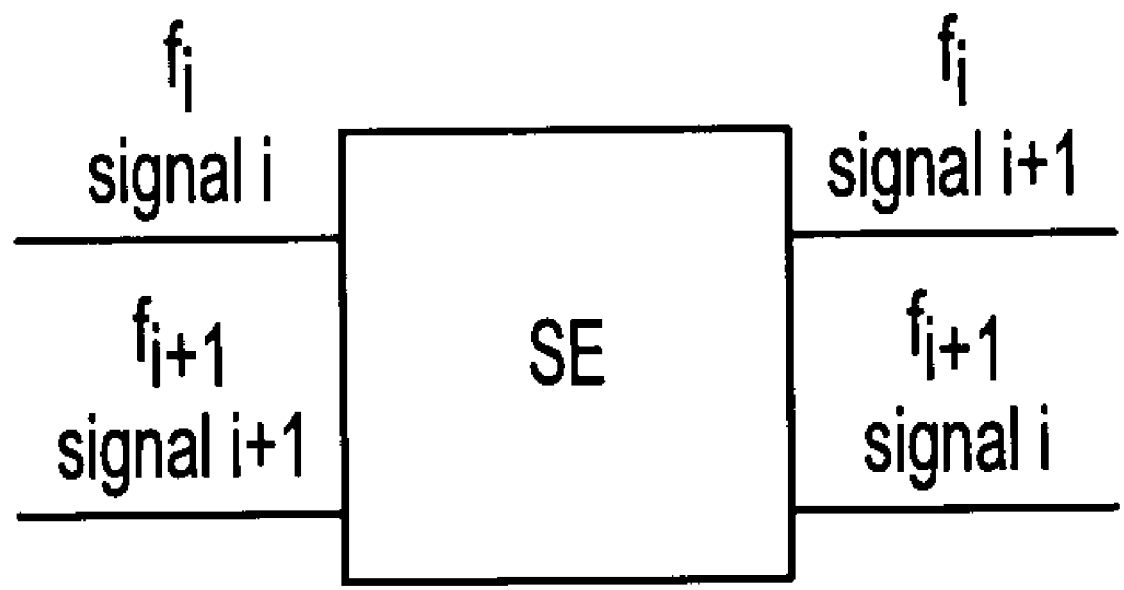

In the present invention architecture, each switching element (SE) switches signals on adjacent carrier frequencies. In the bar state, a switching element (SE) does not modify the frequencies of incoming signals. However, in the cross state, a switching element (SE) swaps the carrier frequencies of incoming signals, as shown in FIG. 14.

Figure 15:
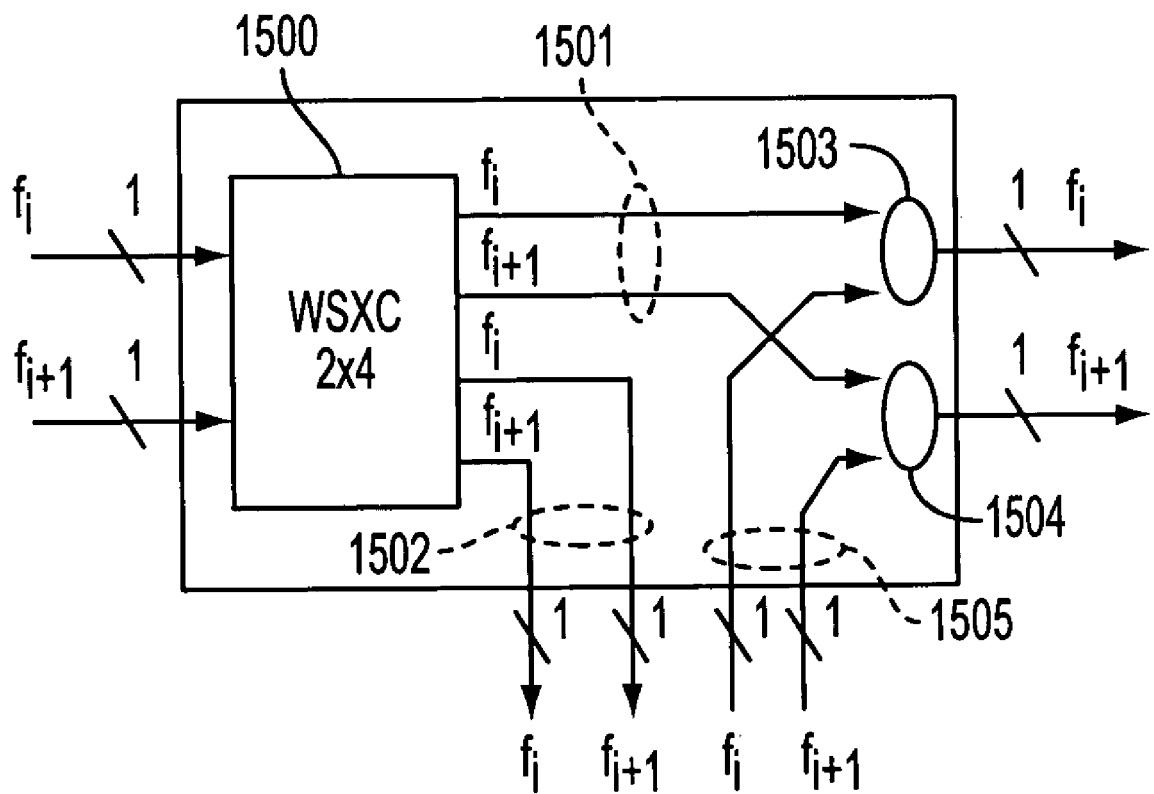
FIG. 15 shows the internal design of a 2×2 switching element in accordance with the present invention.

Referring to FIG. 15, the internal design of a 2×2 switching element is shown. It takes two inputs at carrier frequencies $f_i$ and $f_{i+1}$. The state of the element is given by the state of a 2×4 wavelength-selective cross-connect 1500. In the bar state, the top and bottom input signals are respectively routed to the first and to the second output, in the output set 1501. In the cross state, the top and bottom input signals are respectively routed to the third and to the fourth output, in the set 1502. Two combiners 1503 and 1504 produce two outputs carrying signals on adjacent frequencies, by combining the signals that come directly from the cross-connect 1500 in the output set 1501 and those that come from the state changer in the output set 1505. The first combiner 1503 takes two inputs, its first and second inputs respectively correspond to the first output of the cross-connect and to the output from the state changer dedicated to frequency $f_i$. The second combiner 1504 takes two inputs, its first and second inputs respectively correspond to the second output of the cross-connect and to the output from the state changer dedicated to frequency $f_{i+1}$.

Therefore, each switching element is essentially a space switch, and relies on state changers to provide the frequency-swapping function that is implied when it is in the cross state. In combination with state changers, switching elements provide a dynamic frequency mapping (keep or swap incoming frequencies). This mapping is determined by some wavelength-routing algorithm adapted to the wavelength-interchanger, and by the overall permutation of frequencies realized by the wavelength-interchanger. More specific implementation details concern the choice of a solution for the 2×4 wavelength-selective cross-connect. The choices include micro-electromechanical devices and directional couplers.

2. State Changer

In the present invention design, the function of each state changer is to provide a predetermined fixed frequency-mapping regardless of the state of the switch. This mapping is the following for any $i \leq W/2-1$:

1.) $f_{2i} \rightarrow f_{2i+1} = f_{2i} + \Delta f$
2.) $f_{2i+1} \rightarrow f_{2i} = f_{2i+1} - \Delta f$.

Figure 16:
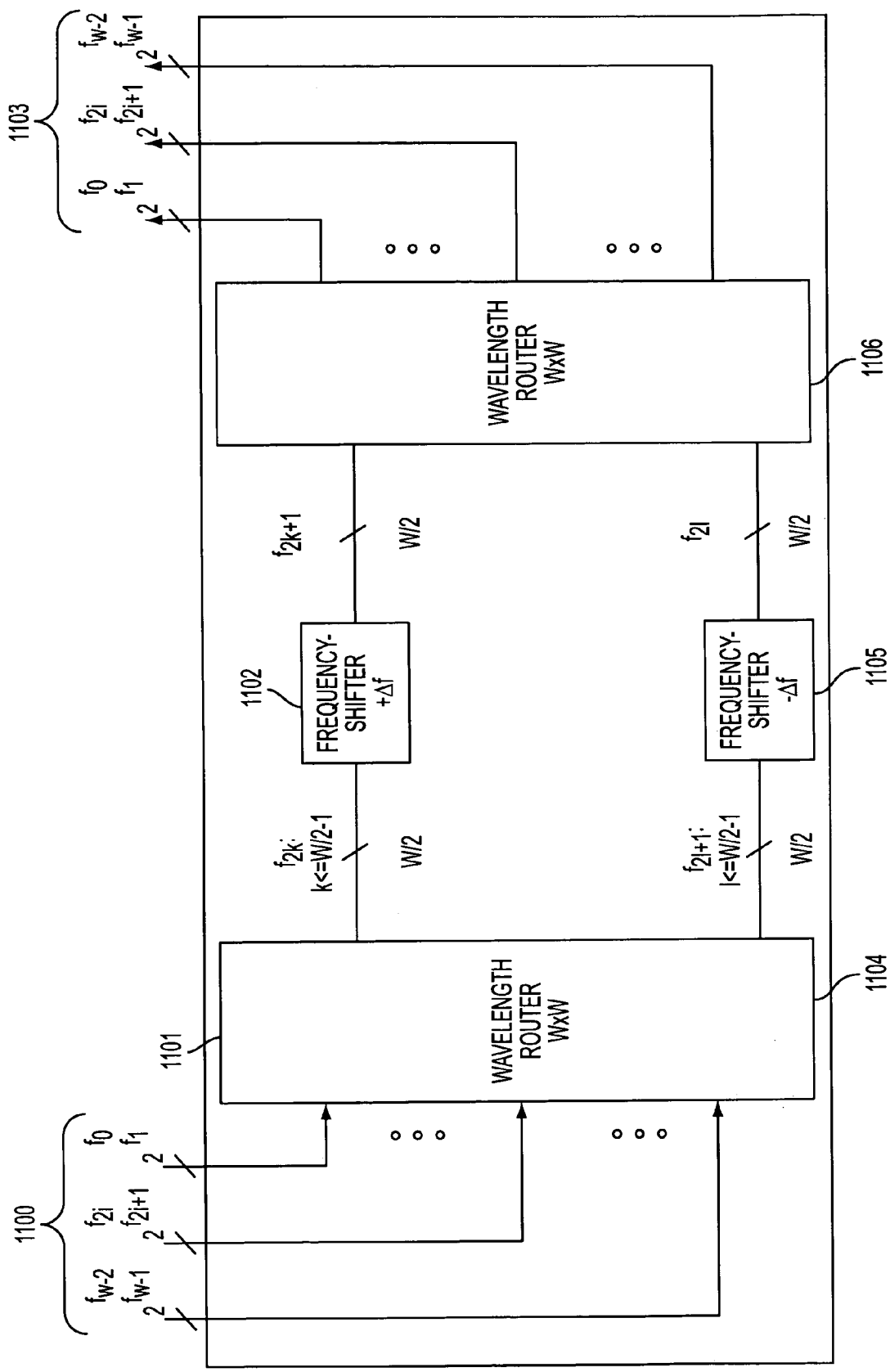
FIG. 16 shows the internal design of a state changer for a partially connected network with 2×2 elements in accordance with the present invention.

That is, even frequencies are translated by $+\Delta f$, while odd frequencies are translated by $-\Delta f$. Such an observation leads to the implementation presented in FIG. 16. That is, FIG. 16 shows the internal design of a state changer for a partially connected network with 2×2 elements, wherein each switch element in the stage sends two signals at optical frequencies of the form $f_{2i}, f_{2i+1}$ into the state changer input 1100. The input frequencies are processed by a first wavelength router 1101 to separate even from odd frequencies. Odd frequencies are decreased by $-\Delta f$ in the frequency shifter 1105. Even frequencies are increased by $+\Delta f$ in the frequency shifter 1102. Finally, all the shifted frequencies are processed by a second wavelength router 1106 to isolate the frequencies assigned to the different switching elements of the stage.

Frequencies are grouped into W/2 outputs 1103 that are sent to the appropriate switching elements. This implementation relies on transparent frequency shifters. One option to build these shifters is to cascade two difference-frequency generation wave-mixers driven by different pump frequencies, as described above with reference to FIG. 3. The wavelength-routers 1101 and 1106 may be built using several technologies such as, for example, arrayed waveguide gratings, dielectric thin films and fiber-bragg gratings.

Regardless of the choice made, it is important to observe that the number of frequency shifters is independent of the number of frequencies. Therefore, in a self-routing Banyan network, state changers can be implemented with a wavelength converter cost of $O(\log_2 W)$. Based on this estimate, state-changers are expected to have a minimum contribution on the overall converter complexity of the wavelength interchanger. In the following sections, it is shown how it is possible to build inter-stage connection modules corresponding to butterfly or shuffle frequency permutations, which either have a constant or a logarithmic converter complexity.

3. Butterfly Inter-Stage Connection Module

In the wavelength domain, the butterfly permutation maps some frequency $f_i = f_0 + i.\Delta f$, such that $b_{w-1} \ldots b_{h+1} b_h b_{h-1} \ldots b_0$ is the binary representation of i, to the frequency $f_j = f_0 + j.\Delta f$, where $b_{w-1} \ldots b_{h+1} b_0 b_{h-1} \ldots b_h$ is the binary representation of j. Therefore for some given $h=0, \ldots, w-1$, the butterfly permutation implements a predetermined fixed frequency mapping. This mapping has the following interesting properties:

1.) Frequencies $f_i$ such that the binary representation of i is of the form $b_{w-1} \ldots b_{h+1} 0 b_{h-1} \ldots 0$ or $b_{w-1} \ldots b_{h+1} 1 b_{h-1} \ldots 1$ are left unchanged.

2.) Frequencies $f_i$ such that the binary representation of i is of the form $b_{w-1} \ldots b_{h+1} 1 b_{h-1} \ldots 0$ are down-shifted by $-(2^h-1)\Delta f$.

3.) Frequencies $f_i$ such that the binary representation of i is of the form $b_{w-1} \ldots b_{h+1} 0 b_{h-1} \ldots 1$ are up-shifted by $+(2^h-1)\Delta f$.

Figure 17:
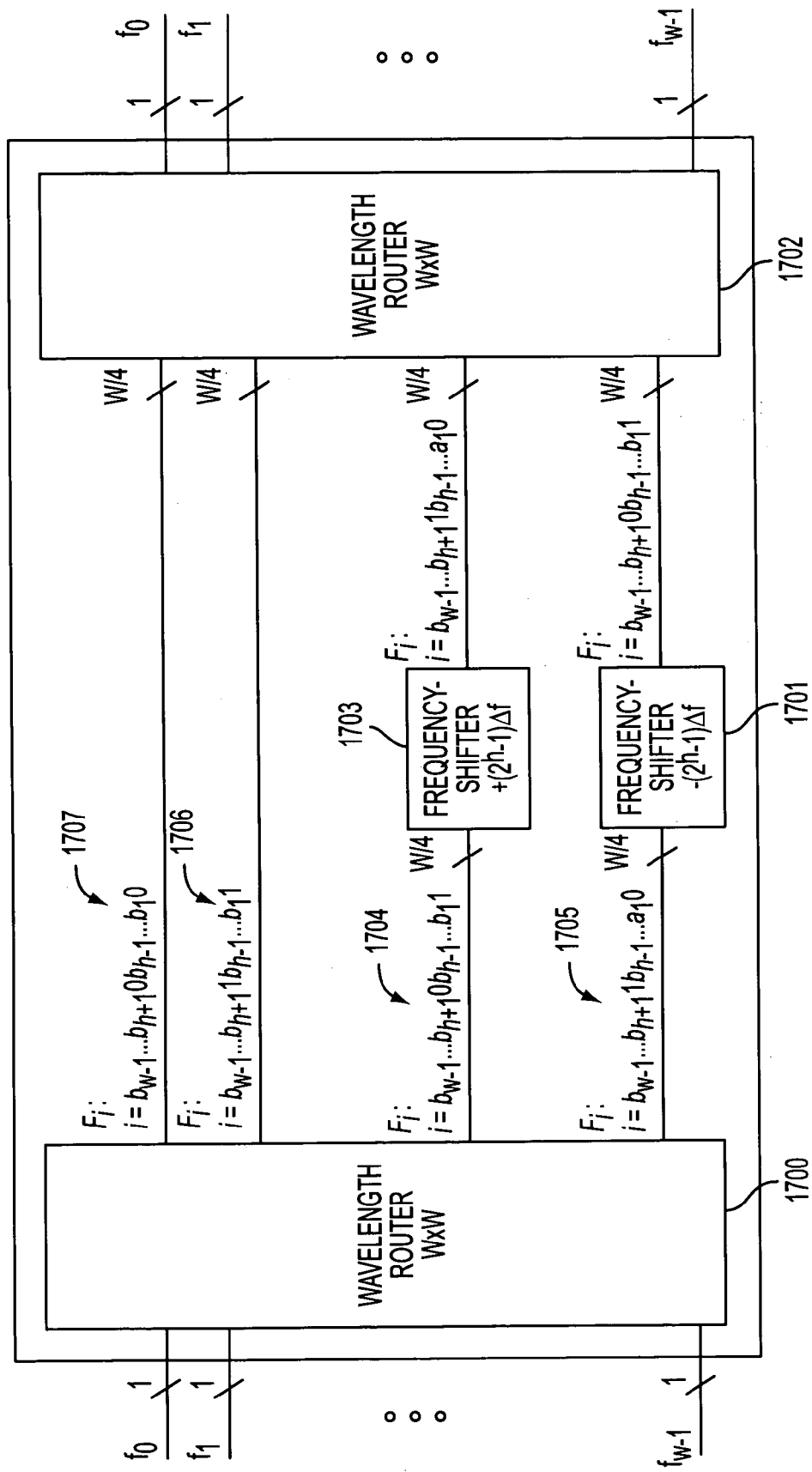
FIG. 17 shows a butterfly inter-stage connection module built with frequency-shifters in accordance with the present invention.

Thus, for some given $h=0, \ldots, w-1$ a butterfly inter-stage connection module may be implemented with two frequency-shifters of $+(2^h-1)\Delta f$ and $-(2^h-1)\Delta f$, and with wavelength-selective components. These wavelength-selective components selectively simply need to route each frequency $f_i$ to the different shifters according to the relative values of the h+1-th least significant digit (bit $b_h$), and that of the least significant digit (bit $b_0$), in the binary representation of the frequency index i, as it is shown in FIG. 17. That is, FIG. 17 shows a butterfly inter-stage connection module built with frequency-shifters, wherein a first wavelength router 1700 groups the frequencies into four disjoint sets as follows:

1.) A first set 1707 contains frequencies $f_i$ such that the binary representation of i is of the form $b_{w-1} \ldots b_{h+1} 0 b_{h-1} \ldots 0$ 2.) A second set 1706 contains frequencies $f_i$ such that the binary representation of i is of the form $b_{w-1} \ldots b_{h+1} 1 b_{h-1} \ldots 1$ 3.) A third set contains frequencies $f_i$ such that the binary representation of i is of the form $b_{w-1} \ldots b_{h+1} 0 b_{h-1} \ldots 1$ 4.) A fourth set 1705 contains frequencies $f_i$ such that the binary representation of i is of the form $b_{w-1} \ldots b_{h+1} 1 b_{h-1} \ldots 0$.

Frequencies in the first set 1707 and in the second set 1706 are directly sent to wavelength router 1702. Frequencies in the third set 1704 are translated by $+(2^h-1)\Delta f$ in frequency shifter 1703, and then sent to wavelength router 1702. Frequencies in the fourth set 1705 are translated by $-(2^h-1)\Delta f$ in frequency shifter 1701, and then sent to wavelength router 1702. The function of the wavelength router 1702 is to direct the incoming frequencies to the proper switching elements in the next stage. When it comes to the practical implementation of the module, there are many choices concerning the nature of the wavelength routers 1700 and 1702, and the realization of the frequency shifters. For the wavelength routers, the choice of techniques mentioned above with respect to the wavelength routers used in state changers (i.e., arrayed waveguide gratings, dielectric thin films, and fiber bragg gratings) are available. However, the complexity of the routing function leads to preferably selecting arrayed waveguide gratings over the other techniques. As for the frequency shifters, they may be implemented with cascaded wavelength converters based on difference-frequency generation, as mentioned above.

In the design of FIG. 17, the converter complexity of a butterfly inter-stage connection module is constant and independent of the number of frequencies. Therefore, all inter-stage connection modules that are required in a self-routing SW-Banyan network may be provided with logarithmic converter complexity.

4. Shuffle and Inverse-Shuffle Inter-Stage Connection Modules

Frequency shuffle and inverse frequency shuffle permutations are implemented with the help of specific mappings called constrained increasing frequency-mappings. Regarding these mappings, detailed discussions of their properties and of their implementation with $O(\log_2 W)$ frequency-shifters is provided in the related U.S. patent application Ser. No. 09/750,304. Both frequency-shuffle and inverse-frequency shuffle interstage connection modules provide fixed frequency mappings regardless of the state of the wavelength-interchanger. For a given $0 \leq h \leq w-1$, the shuffle $\sigma_h$ does a right-to-left circular permutation of the last $h+1$ bits of any sequence of binary digits. In other words, $\sigma_h$ maps any sequence $b_{w-1} b_{w-2} \ldots b_0$ to $b_{w-1} b_{h+1} b_{h-1} \ldots b_0 b_h$. For a given $0 \leq h \leq w-1$, the inverse shuffle permutation is simply the inverse permutation of the shuffle $\sigma_h$, and is therefore denoted by $\sigma_h^{-1}$. The permutation $\sigma_h^{-1}$ maps some binary sequence $b_{w-1} b_{w-2} \ldots b_0$ to $b_{w-1} \ldots b_0 b_h \ldots b_1$. In the wavelength domain, both types of permutations may be conveniently described with increasing frequency-mappings (see related U.S. patent application Ser. No. 09/750,304 referenced above).

In a system with $W = 2^w$ frequencies of the form $f_i = f_0 + i \cdot \Delta f$, specific sets of frequencies are considered and denoted by $\Phi^h$ where $0 \leq h \leq w-1$. For a given value of h, the set $\Phi^h$ contains all the frequencies such that the h-th least significant digit of the binary representation of their index is null. In other words, a frequency $f_i$ belongs to $\Phi^h$ if the binary representation of i is $b_{w-1} \ldots b_0$, where $b_h = 0$. Then the mapping $\Gamma_h$ is introduced such that some input frequency $$f_j = f_0 + \Delta f \cdot \left( \sum_{l=0}^{w-1} 2^l \cdot b_l \right)$$

in $\Phi^h$ is mapped to $$\Gamma_h(f_j) = f_0 + \Delta f \cdot \left( \sum_{l=h+1}^{w-1} 2^l \cdot b_l + 2 \cdot \sum_{l=0}^{h} 2^l \cdot b_l \right)$$

in $\Phi^0$, where $b_{w-1} \ldots b_0$ is the binary representation of i. The mapping $\Gamma_h$ is an increasing up-conversion according to related U.S. patent application Ser. No. 09/750,304 referenced above.

The inverse mapping of $\Gamma_h$ is also considered, which is denoted as $\Gamma_h^{-1}$. The mapping $\Gamma_h^{-1}$ maps some input frequency $$f_j = f_0 + \Delta f \cdot \left( \sum_{l=0}^{w-1} 2^l \cdot b_l \right)$$

in $\Phi^0$ to $$\Gamma_h^{-1}(f_j) = f_0 + \Delta f \cdot \left( \sum_{l=h+1}^{w-1} 2^l \cdot b_l + \frac{1}{2} \cdot \sum_{l=0}^{h} 2^l \cdot b_l \right)$$

in $\Phi^h$, where $b_{w-1} \ldots b_0$ is the binary representation of j. It is easy to see that the inverse mapping $\Gamma_h^{-1}$ is an increasing down-conversion according to related U.S. patent application Ser. No. 09/750,304 referenced above.

Assuming that for some frequency $f_i = f_0 + i \cdot \Delta f$ the binary representation of i is $b_{w-1} \ldots b_0$. The shuffle $\sigma_h$ is implemented with the increasing frequency up-conversion mapping $\Gamma_h$ as follows:

1.) For any frequency $f_i$ such that $b_h = 0$, $\sigma_h(f_i) = \Gamma_h(f_i)$; and 2.) For any frequency $f_i$ such that $b_h = 1$, $\sigma_h(f_i) = \Gamma_h(f_i - 2^h \cdot \Delta f) + \Delta f$.

Similarly, the inverse shuffle $\sigma_h^{-1}$ is implemented with the increasing frequency down-conversion mapping $\Gamma_h^{-1}$ as follows:

1.) For any frequency $f_i$ such that $b_0 = 0$, $\sigma_h^{-1}(f_i) = \Gamma_h^{-1}(f_i)$; and 2.) For any frequency $f_i$ such that $b_0 = 1$, $\sigma_h^{-1}(f_i) = \Gamma_h^{-1}(f_i - \Delta f) + 2^h \cdot \Delta f$.

Therefore for some given value of h in the range $0, \ldots, w-1$, shuffle and inverse-shuffle frequency permutations are efficiently implemented by a pair of frequency-shifters, a pair of identical constrained increasing logarithmic up-converters or down-converters, and wavelength-selective components. The function of the wavelength-selective components is to selectively direct each frequency $f_i$ to any of the frequency-shifters, or any of the logarithmic constrained increasing converters, according to the least significant digit (for the corresponding inverse shuffle permutation), or according to the h+1-th least significant digit (for the corresponding shuffle permutation) of the binary representation of the frequency index i.

Figure 18:
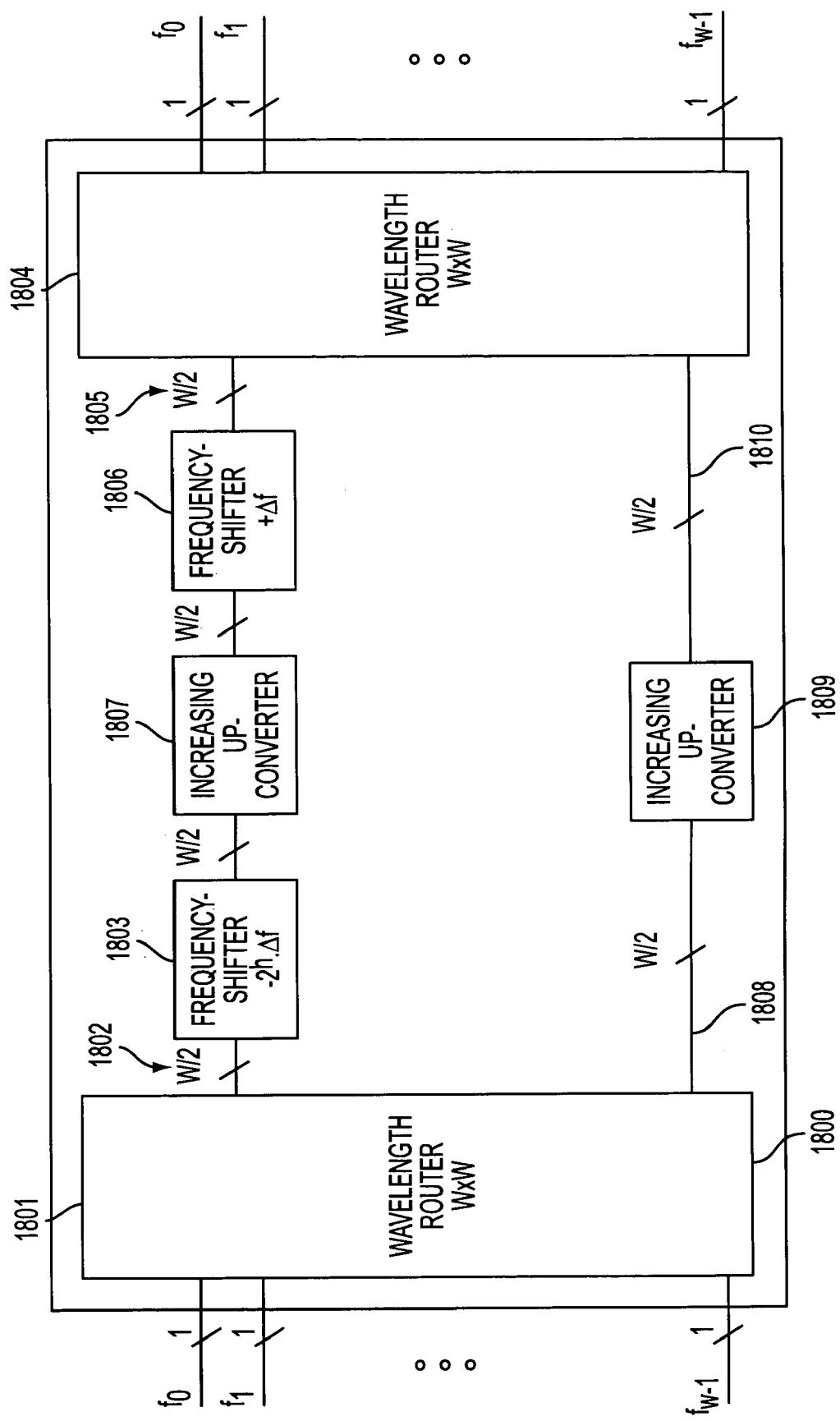
FIG. 18 shows a generic frequency shuffler in accordance with the present invention.
Figure 19:
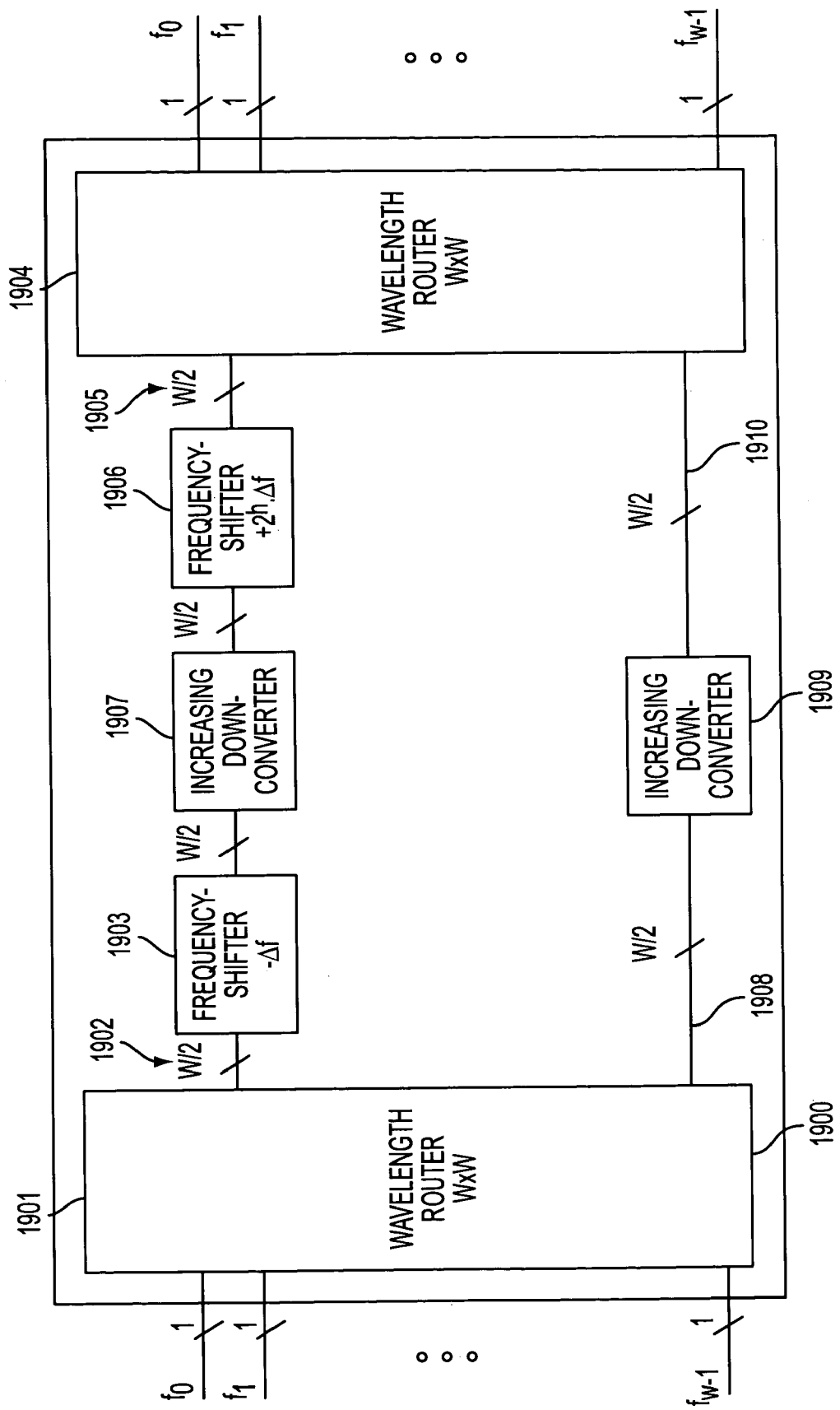
FIG. 19 shows a generic inverse frequency shuffler in accordance with the present invention.
Figure 20:
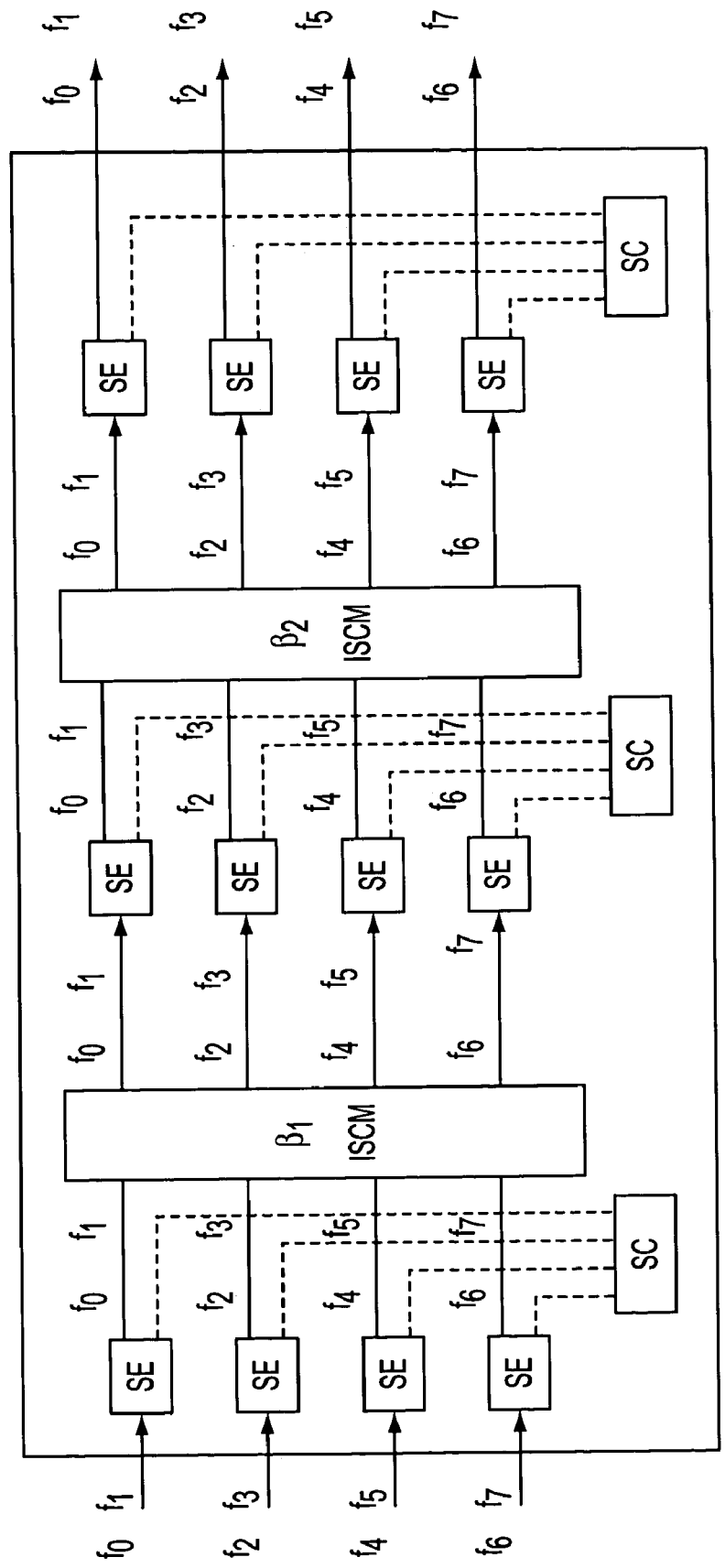
FIG. 20 shows an implementation of the 8×8 SW-Banyan network of FIG. 9 in accordance with the present invention.
Figure 21:
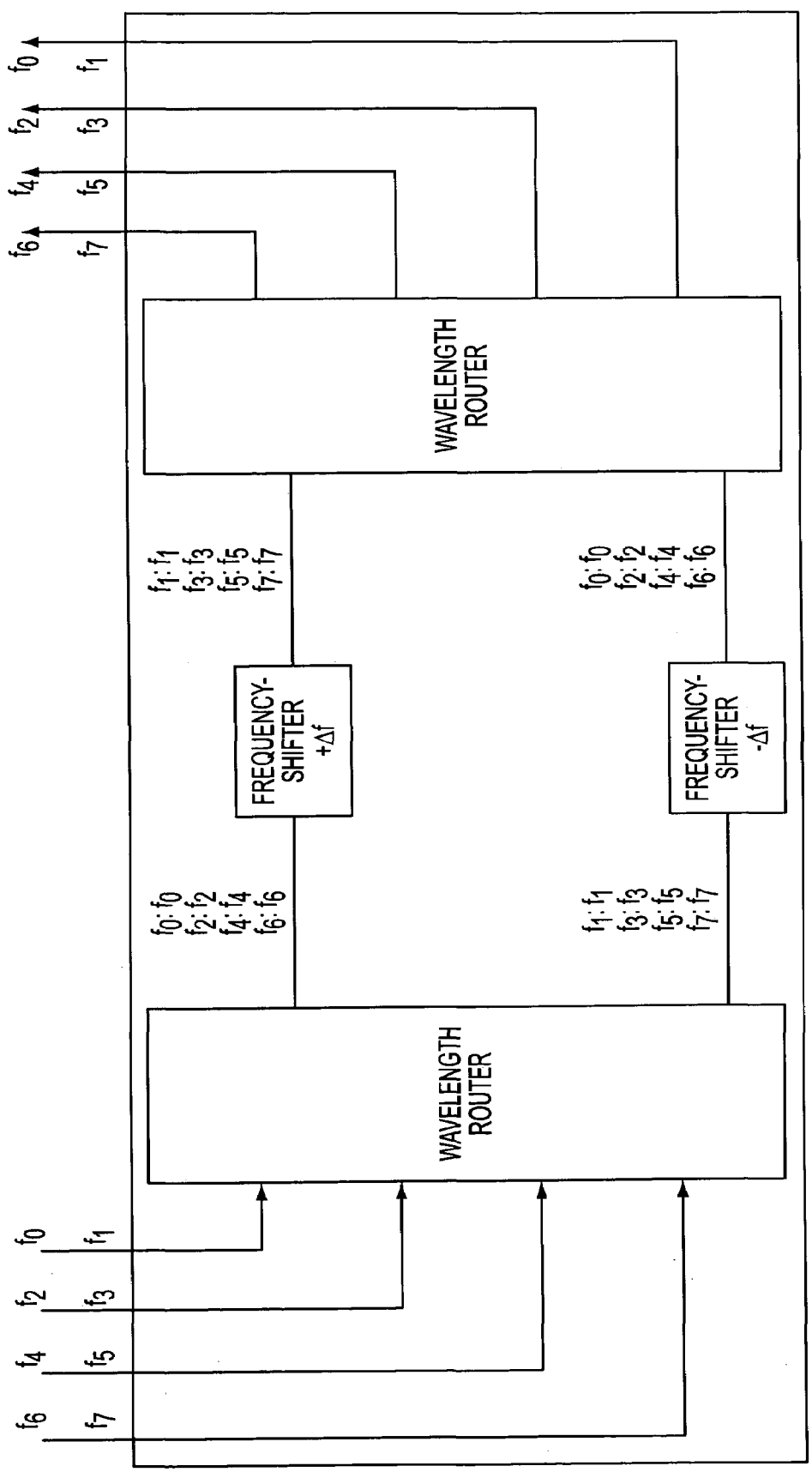
FIG. 21 shows a state changer for the 8×8 SW-Banyan network of FIG. 9 in accordance with the present invention.
Figure 22:
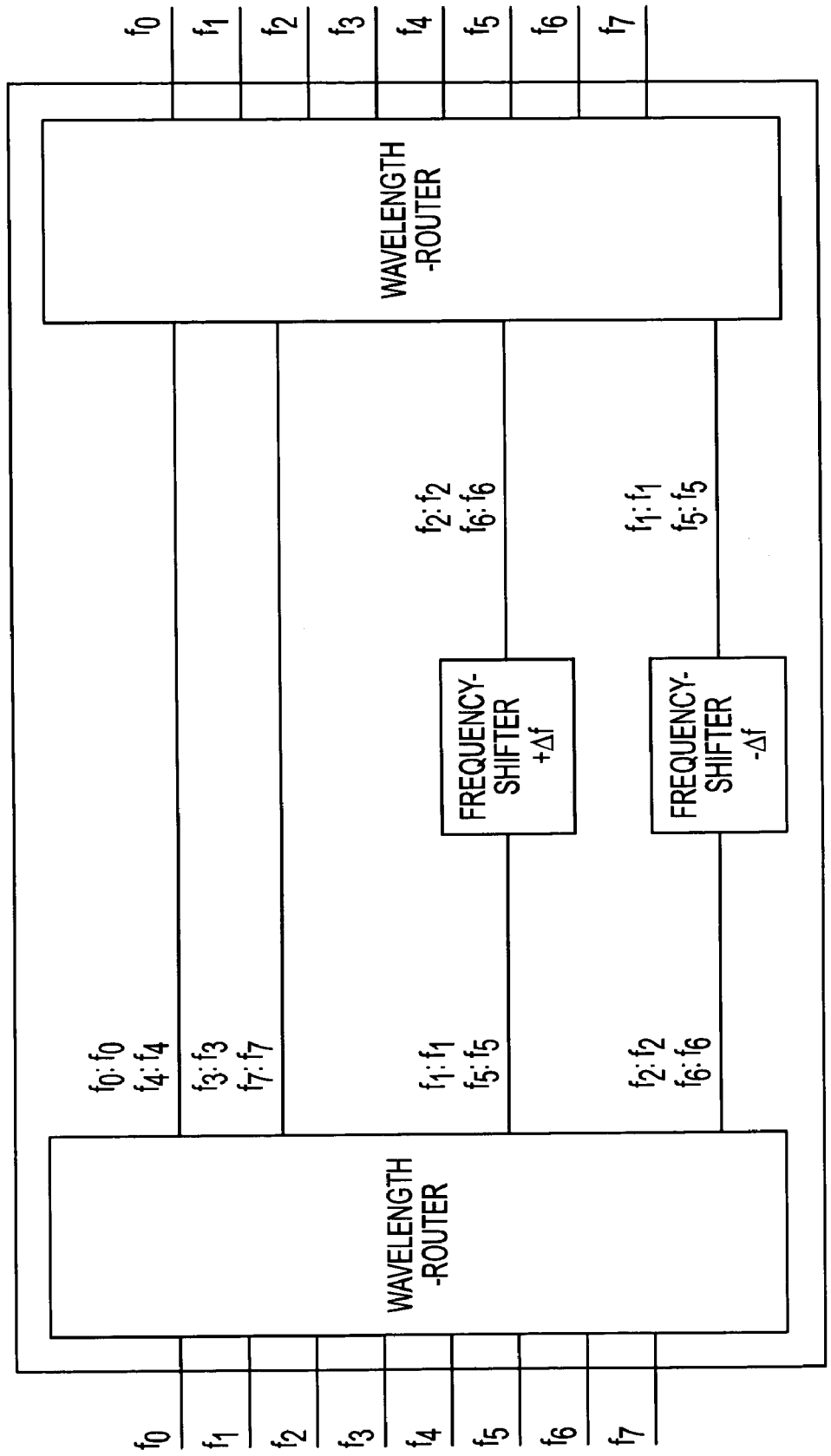
FIG. 22 shows an inter-stage connection module between stages 0 and 1 for the 8×8 SW-Banyan network of FIG. 9 in accordance with the present invention.
Figure 23:
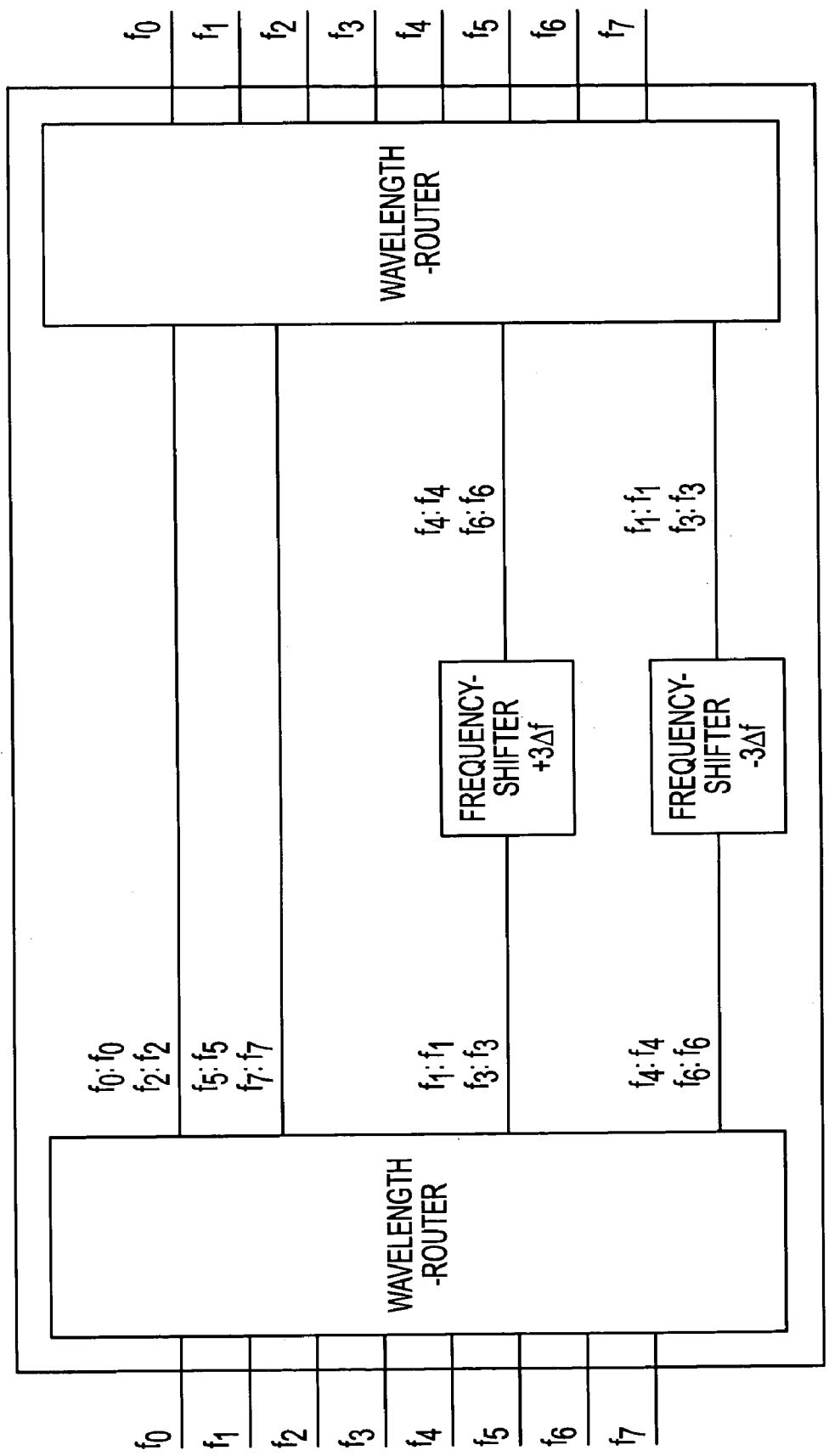
FIG. 23 shows an inter-stage connection module between stages 1 and 2 for the 8×8 SW-Banyan network of FIG. 9 in accordance with the present invention.

The above equations naturally lead to the designs of that are shown in FIGS. 18 and 19. In FIG. 18, frequency shuffler 1800 takes distinct frequencies at the input. These incoming frequencies are directed to two types of outputs by a first wavelength router 1801. A first type of output from wavelength router 1801 receives any input frequency $f_i$ such that $b_h=1$. This first set of frequencies are then shifted by $-2^h.\Delta f$, by frequency shifter 1803 and then sent to an increasing up-converter 1807 that implements the mapping $\Gamma_h$. The frequencies that leave increasing up-converter 1807 are shifted by an amount $\Delta f$ by frequency shifter 1806 and then sent as inputs 1805 to a second wavelength router 1804. Wavelength router 1801 produces a second type of output 1808 that receives any input frequency $f_i$ such that $b_h=0$. Frequencies of this second set are sent to a second increasing up-converter 1809 that also implements the mapping $\Gamma_h$. The frequencies that leave increasing up-converter 1809 are sent as inputs 1810 to the wavelength router 1804.

In FIG. 19, the inverse frequency shuffler 1900 takes distinct frequencies at the input. These incoming frequencies are directed to two types of outputs by a first wavelength router 1901. A first type of output from wavelength router 1901 receives any frequency $f_i$ such that $b_0=1$. This first set of frequencies are then shifted by $-\Delta f$ by frequency shifter 1903 and then sent to an increasing down-converter 1907 that implements the mapping $\Gamma_h^{-1}$. The frequencies that leave down-converter 1907 are shifted by an amount $+2^h\Delta f$ by frequency shifter 1906 and then sent as inputs 1905 to a second wavelength router 1904. Wavelength router 1901 produces a second type of output 1908 that receives any input frequency i such that $b_0=0$. Frequencies of this second set are sent to a second increasing down-converter 1909 that also implements the mapping $\Gamma_h^{-1}$. The frequencies that leave down-converter 1909 are sent as inputs 1910 to wavelength router 1904.

5. Overall Converter Complexity

The converter costs of the different components of the SW-Banyan architectures described above are summarized in the table of FIG. 26. The total number of frequency shifters is $2.\log_2(W)-1$. When frequency shifters are built as cascaded wavelength converters based on difference-frequency generation, the cost doubles to $4.\log_2(W)-2$. Therefore, the converter complexity is $O(\log_2 W)$ instead of $O(w)$. It is straightforward to perform similar computations for other self-routing networks. The results are summarized in the table of FIG. 27. This small complexity subsequently enables the building of multi-log networks that are based on the SW-Banyan network, are rearrangeably or strictly non-blocking and still have a low converter complexity of $O((\log_2 W)^n)$, where n is some small integer constant.

6. Example

In FIGS. 20 to 23 there is shown an application of the techniques described in previous sections to the 8×8 self-routing SW-Banyan network of FIG. 9. The overall design uses ten frequency shifters.

D. Multi-Log Wavelength Interchangers

1. Design

As described above, there are economical ways to implement self-routing wavelength interchangers. In wavelength switching networks, the self-routing property does not provide any benefits, but rather leads to blocking. In self-routing networks blocking occurs because there is a unique path for each input-output pair, and some switching elements are shared by more than 2 input-output pairs (see A. Pattavina referenced above). To remove this problem, well-known techniques are horizontal extensions and vertical replications as described above. These techniques allow rearrangeable or strictly non-blocking multi-log networks to be built starting from self-routing networks. These techniques can also be applied to self-routing wavelength interchangers built in accordance with the present invention.

Figure 24:
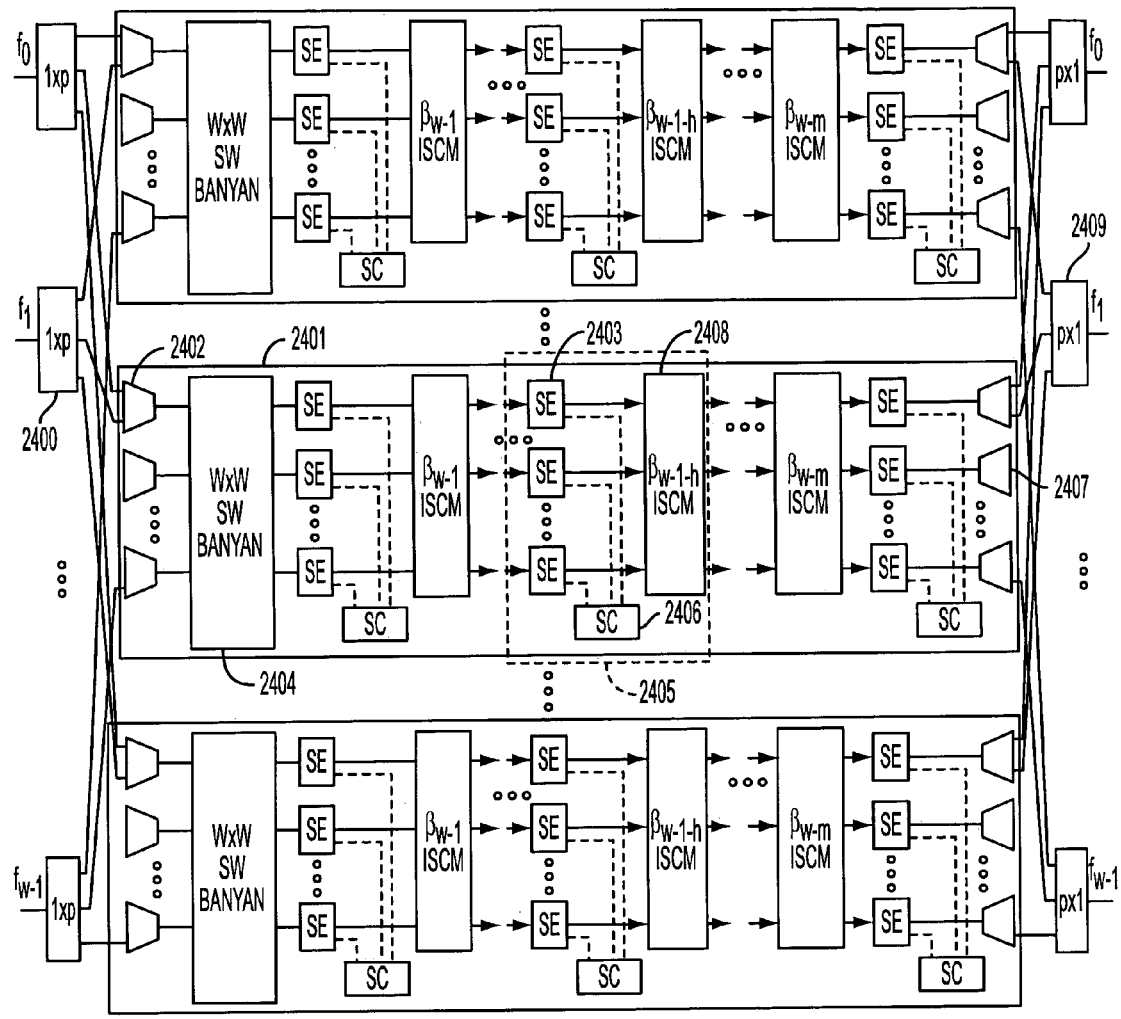
FIG. 24 shows a $\log_2(W,m,p)$ wavelength interchanger based on SW-Banyan wavelength interchangers in accordance with the present invention.

In the case of the SW-Banyan network, a $\log_2(W,m,p)$ wavelength interchanger can be provided based on the SW-Banyan wavelength interchangers described above, as shown in FIG. 24. That is, FIG. 24 shows a $\log_2(W,m,p)$ wavelength interchanger wherein each incoming frequency is directed to one of the p stacked copies of a horizontally-extended W×W SW-Banyan wavelength interchanger by a 1×p selector switch, such as 2400. In a given copy of the horizontally-extended SW-Banyan network, such as 2401, an input frequency is first multiplexed with a signal on an adjacent carrier frequency by a multiplexer, such as 2402. The multiplexed signals are then directed to a W×W SW-Banyan wavelength interchanger, such as 2404, in the copy selected for the input frequency. This SW-Banyan wavelength interchanger may be built according to the present invention principles as described above with respect to FIGS. 13–17.

After being switched through the self-routing Banyan network, the wavelength channel goes through m additional stages, such as 2405. In one of these stages, the channel is switched by 2×2 switching elements (SE), such as 2403, and state changers (SC), such as 2406, and butterfly inter-stage connection modules (ISCM), such as 2408, that are built according to the present invention principles as described above with respect to FIGS. 15, 16 and 17, respectively. At the output of the last switching stage in the copy, the channels are demultiplexed by demultiplexers, such as 2407, and sent to an appropriate px1 switch, such as 2409, that is dedicated to signals on some given output carrier frequency.

Many variations of this basic architecture may be obtained according to the choice of specific technologies to build multiplexers, switching elements, inter-stage connection modules, and other components that are implied by the architecture. However, these issues have also been addressed above. Also, it is straightforward to provide a similar description for multi-log networks built out of other self-routing networks such as the n-cube, omega, or baseline networks. The only change to be done is to replace the inter-stage connection modules appropriately. As previously mentioned, the blocking characteristics of multi-log networks depend on the quantitative relationships between the parameters of the network. Thus, it is now appropriate to focus on multi-log networks built out of SW-Banyan self-routing networks and evaluate the converter complexity of the architecture for specific values of the parameters that correspond to rearrangeably or to strictly non-blocking networks.

2. Converter Complexity

For some arbitrary $\log_2(W,m,p)$ network built according to the design of FIG. 24, the frequency shifter complexity is $p.[2 \log_2(W)+2m-2]$. According to previous work on multi-log networks, the wavelength interchanger becomes rearrangeable if any of the following conditions is satisfied:

1.)

$$p \geq 2^{\frac{w-m}{2}}, \text{ where } w = \log_2 W$$

2.) p=1, and m=w−1.

A near-optimal alternative to obtain a rearrangeably non-blocking log$_2$(W,m,p) wavelength interchanger with a reduced frequency shifter complexity is to meet the second condition. In this case, the overall frequency shifter complexity of the rearrangeably non-blocking wavelength interchanger is 4 log$_2$(W)−4. When these interchangers are used in separable cross-connects according to the design of FIG. 8 above, rearrangeably non-blocking (F.W)×(F.W) wavelength-interchanging cross-connects are obtained with a total frequency shifter complexity of O(F.log$_2$ W).

To obtain a strictly non-blocking multi-log wavelength interchanger, p needs to be selected according to the following criteria:

$$p \geq \begin{cases} \frac{3}{2} \cdot 2^{\frac{w-m}{2}} + m - 1, & w+m \text{ even} \\ 2^{\frac{w-m+1}{2}} + m - 1, & w+m \text{ odd} \end{cases}, \text{ where } w = \log_2 W.$$

A near optimal frequency shifter complexity is obtained with log$_2$(W,log$_2$(W)−1,log$_2$(W)), where the frequency shifter complexity is 4.log$_2$(W).(log$_2$(W)−1). All of the above-mentioned results are summarized in the table of FIG. 28, wherein w=log$_2$ W and F is the number of fibers.

In summary, the present invention provides a novel approach to building wavelength-interchanging cross-connects (i.e., all-optical cross-connects capable of changing the frequency of incoming signals). The new approach is characterized by a new wavelength-to-space transformation and new ways to exploit wave-mixing converters. The main principle of the transformation is to assign frequency $f_{i \bmod w}$ to some inlet or outlet i in each stage, where W is the number of frequencies in the system. Through this transformation, well-known space-switch architectures can be naturally extended to the wavelength domain. Wave-mixing converters are also used to provide cost-effective implementations of the new cross-connects. In the architecture, wave-mixing converters serve to change the states of the switching elements and to provide inter-stage connections. Overall, the new approach enables the construction of wavelength-interchanging cross-connects with significantly reduced converter requirements. Indeed, some examples of wavelength-interchanging cross-connects are shown with a converter complexity of O(F.(log$_2$ W)$^n$), where F is the number of fibers, and n=1,2,3. This compares favorably with previous designs that have converter complexities of O(F.W).

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for interchanging wavelengths in a multi-wavelength system having W wavelength channels, the method comprising the steps of:
   selectively directing a pair of adjacent frequency channels corresponding to a respective pair of adjacent wavelength channels based upon a routing algorithm;
   interchanging the frequencies of the selectively directed pair of adjacent frequency channels; and
   selectively shifting the interchanged frequencies of the selectively directed pair of adjacent frequency channels based upon a binary representation of each interchanged frequency.

2. The method as defined in claim 1, wherein the step of selectively directing the pair of adjacent frequency channels comprises the step of:
   selectively switching the pair of adjacent frequency channels to one of two output pairs.

3. The method as defined in claim 1, wherein the step of interchanging the frequencies of the selectively directed pair of adjacent frequency channels comprises the step of:
   routing the selectively directed pair of adjacent frequency channels based upon a binary representation of the frequency of each of the selectively directed pair of adjacent frequency channels.

4. The method as defined in claim 3, wherein the step of interchanging the frequencies of the selectively directed pair of adjacent frequency channels further comprises the steps of:
   shifting the frequency of a first of the selectively directed pair of adjacent frequency channels by an amount defined by +Δf; and
   shifting the frequency of a second of the selectively directed pair of adjacent frequency channels by an amount defined by −Δf;
   wherein Δf is the frequency spacing between the pair of adjacent frequency channels.

5. The method as defined in claim 1, wherein the step of selectively shifting the interchanged frequencies of the selectively directed pair of adjacent frequency channels comprises the step of:
   routing the selectively directed pair of adjacent frequency channels based upon the binary representation of each interchanged frequency.

6. The method as defined in claim 5, wherein the step of selectively shifting the interchanged frequencies of the selectively directed pair of adjacent frequency channels further comprises the step of:
   shifting the frequency of at least one of the selectively directed pair of adjacent frequency channels by an amount defined by ±($2^h$−1)Δf, wherein h=0, . . . , w−1, w=log$_2$ W, and Δf is the frequency spacing between the pair of adjacent frequency channels.

7. The method as defined in claim 5, wherein the step of selectively shifting the interchanged frequencies of the selectively directed pair of adjacent frequency channels further comprises the steps of:
   shifting the frequency of at least one of the selectively directed pair of adjacent frequency channels by an amount defined by −$2^h$Δf;
   increasing the shifted frequency of the at least one of the selectively directed pair of adjacent frequency channels; and shifting the increased shifted frequency of the at least one of the selectively directed pair of adjacent frequency channels by an amount defined by $+\Delta f$;

wherein $h=0,\ldots,w-1$, $w=\log_2 W$, and $\Delta f$ is the frequency spacing between the pair of adjacent frequency channels.

8. The method as defined in claim 5, wherein the step of selectively shifting the interchanged frequencies of the selectively directed pair of adjacent frequency channels further comprises the steps of:

shifting the frequency of at least one of the selectively directed pair of adjacent frequency channels by an amount defined by $-\Delta f$;

decreasing the shifted frequency of the at least one of the selectively directed pair of adjacent frequency channels; and shifting the decreased shifted frequency of the at least one of the selectively directed pair of adjacent frequency channels by an amount defined by $+2^h\Delta f$;

wherein $h=0,\ldots,w-1$, $w=\log_2 W$, and $\Delta f$ is the frequency spacing between the pair of adjacent frequency channels.

9. An apparatus for interchanging wavelengths in a multi-wavelength system having W wavelength channels, the apparatus comprising:

a switching element for selectively directing a pair of adjacent frequency channels corresponding to a respective pair of adjacent wavelength channels based upon a routing algorithm;

a state changer for interchanging the frequencies of the selectively directed pair of adjacent frequency channels; and a connection module for selectively shifting the interchanged frequencies of the selectively directed pair of adjacent frequency channels based upon a binary representation of each interchanged frequency.

10. The apparatus as defined in claim 9, the switching element comprises:

a cross-connect for selectively switching the pair of adjacent frequency channels to one of two output pairs.

11. The apparatus as defined in claim 9, wherein the state changer comprises:

a router for routing the selectively directed pair of adjacent frequency channels based upon a binary representation of the frequency of each of the selectively directed pair of adjacent frequency channels.

12. The apparatus as defined in claim 11, wherein the state changer further comprises:

a first frequency shifter for shifting the frequency of a first of the selectively directed pair of adjacent frequency channels by an amount defined by $+\Delta f$; and a second frequency shifter for shifting the frequency of a second of the selectively directed pair of adjacent frequency channels by an amount defined by $-\Delta f$;

wherein $\Delta f$ is the frequency spacing between the pair of adjacent frequency channels.

13. The apparatus as defined in claim 9, wherein the connection module comprises:

a router for routing the selectively directed pair of adjacent frequency channels based upon the binary representation of each interchanged frequency.

14. The apparatus as defined in claim 13, wherein the connection module further comprises:

at least one frequency shifter for shifting the frequency of at least one of the selectively directed pair of adjacent frequency channels by an amount defined by $\pm(2^h-1)\Delta f$, wherein $h=0,\ldots,w-1$, $w=\log_2 W$, and $\Delta f$ is the frequency spacing between the pair of adjacent frequency channels.

15. The apparatus as defined in claim 13, wherein the connection module further comprises:

a first frequency shifter for shifting the frequency of at least one of the selectively directed pair of adjacent frequency channels by an amount defined by $-2^h\Delta f$;

an increasing up-converter for increasing the shifted frequency of the at least one of the selectively directed pair of adjacent frequency channels; and a second frequency shifter for shifting the increased shifted frequency of the at least one of the selectively directed pair of adjacent frequency channels by an amount defined by $+\Delta f$;

wherein $h=0,\ldots,w-1$, $w=\log_2 W$, and $\Delta f$ is the frequency spacing between the pair of adjacent frequency channels.

16. The apparatus as defined in claim 13, wherein the connection module further comprises:

a first frequency shifter for shifting the frequency of at least one of the selectively directed pair of adjacent frequency channels by an amount defined by $-\Delta f$;

an increasing down-converter for decreasing the shifted frequency of the at least one of the selectively directed pair of adjacent frequency channels; and a second frequency shifter for shifting the decreased shifted frequency of the at least one of the selectively directed pair of adjacent frequency channels by an amount defined by $+2^h\Delta f$;

wherein $h=0,\ldots,w-1$, $w=\log_2 W$, and $\Delta f$ is the frequency spacing between the pair of adjacent frequency channels.

17. A method for interchanging wavelengths in a multi-wavelength system having W wavelength channels, the method comprising the steps of:

selectively switching a pair of adjacent optical frequency signals corresponding to a respective pair of adjacent wavelength channels to one of two output signal pairs;

interchanging the frequencies of the selectively switched pair of adjacent optical frequency signals from one of the two output signal pairs; and selectively shifting the interchanged frequencies of the selectively switched pair of adjacent optical frequency signals based upon a value of a binary representation of each interchanged frequency.

18. The method as defined in claim 17, further comprising:

selectively shifting the frequencies of the selectively switched pair of adjacent optical frequency signals from another one of the two output signal pairs based upon a value of a binary representation of each interchanged frequency.

19. An apparatus for interchanging wavelengths in a multi-wavelength system having W wavelength channels, the apparatus comprising:

a switching element for selectively switching a pair of adjacent optical frequency signals corresponding to a respective pair of adjacent wavelength channels to one of two output signal pairs;

a state changer for interchanging the frequencies of the selectively switched pair of adjacent optical frequency signals from one of the two output signal pairs; and a connection module for selectively shifting the interchanged frequencies of the selectively switched pair of adjacent optical frequency signals based upon a value of a binary representation of each interchanged frequency.

20. The apparatus as defined in claim 19, wherein the connection module also selectively shift the frequencies of the selectively switched pair of adjacent optical frequency signals from another one of the two output signal pairs based upon a value of a binary representation of each interchanged frequency.

* * * * *